(12) United States Patent
Itoh

(10) Patent No.: US 9,338,328 B2
(45) Date of Patent: May 10, 2016

(54) IMAGE PROCESSING APPARATUS, IMAGE PROCESSING SYSTEM, AND IMAGE PROCESSING METHOD

(71) Applicant: Takanori Itoh, Kanagawa (JP)

(72) Inventor: Takanori Itoh, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/474,756

(22) Filed: Sep. 2, 2014

(65) Prior Publication Data

US 2015/0070738 A1    Mar. 12, 2015

(30) Foreign Application Priority Data

Sep. 10, 2013   (JP) ................................ 2013-187761

(51) Int. Cl.
  *G03F 3/08*     (2006.01)
  *H04N 1/60*    (2006.01)
  *H04N 1/54*    (2006.01)

(52) U.S. Cl.
  CPC ............... *H04N 1/6077* (2013.01); *H04N 1/54* (2013.01); *H04N 1/6022* (2013.01)

(58) Field of Classification Search
  None
  See application file for complete search history.

(56) References Cited

U.S. PATENT DOCUMENTS

| | | | |
|---|---|---|---|
| 2009/0097046 A1 | 4/2009 | Ohta et al. | |
| 2011/0090521 A1 | 4/2011 | Ohta et al. | |
| 2011/0235062 A1 | 9/2011 | Suzuki | |
| 2012/0062956 A1 | 3/2012 | Kitagawa et al. | |
| 2012/0063802 A1 | 3/2012 | Suzuki et al. | |
| 2012/0134696 A1 | 5/2012 | Kobayashi et al. | |
| 2013/0070268 A1 | 3/2013 | Yoshida et al. | |
| 2013/0164004 A1 | 6/2013 | Ai | |
| 2013/0242350 A1 | 9/2013 | Yoshida et al. | |
| 2013/0250365 A1 | 9/2013 | Yoshida et al. | |
| 2013/0265608 A1 | 10/2013 | Yoshida et al. | |
| 2014/0204435 A1* | 7/2014 | Kobayashi | 358/518 |

FOREIGN PATENT DOCUMENTS

| | | |
|---|---|---|
| JP | 2007-049338 | 2/2007 |
| JP | 4732031 | 4/2011 |
| JP | 2011-150026 | 8/2011 |

(Continued)

*Primary Examiner* — Helen Q Zong
(74) *Attorney, Agent, or Firm* — Oblon, McClelland, Maier & Neustadt, L.L.P

(57) ABSTRACT

The present invention includes a first generating unit that generates a recording-amount of a chromatic-color-material in each pixel of a color-image from first image data indicating the color-image; a second generating unit that generates a recording-amount of a transparent-color-material in each pixel of a transparent-image from second image data indicating the transparent-image; a storage unit that stores an upper-limit-recording-amount of the color-materials and an upper-limit-recording-amount assignable to the transparent-color-material, for color material image data indicating an image formed from the recording-amount of the chromatic-color-material and the recording-amount of the transparent-color-material; and a correcting unit that calculates a recording-amount assignable to the transparent-color-material by subtracting the recording-amount of the chromatic-color-material from the upper-limit-recording-amount of the color-materials, and corrects the recording-amount of the transparent-color-material in each pixel based on a ratio of the calculated recording-amount assignable to the transparent-color-material and the upper-limit-recording-amount assignable to the transparent-color-material.

9 Claims, 21 Drawing Sheets

(56) References Cited

FOREIGN PATENT DOCUMENTS

| JP | 2011-197572 | 10/2011 |
| JP | 2012-037732 | 2/2012 |
| JP | 2012-048060 | 3/2012 |
| JP | 2012-083736 | 4/2012 |
| JP | 2012-084135 | 4/2012 |
| JP | 2012-133323 | 7/2012 |

\* cited by examiner

COLOR PLANE IMAGE DATA

FIG.9
| NAME OF GLOSS CONTROL | GLOSS | DEVIATION |
|---|---|---|
| PREMIUM GLOSS (PG) | Gs≥80 | ΔGs≤10 |
| GLOSS (G) | Gs=Gs (SOLID GLOSS) | ΔGs≤10 |
| MATT (M) | Gs=Gs (1C WITH 30% HALFTONE) | ΔGs≤10 |
FIG.10
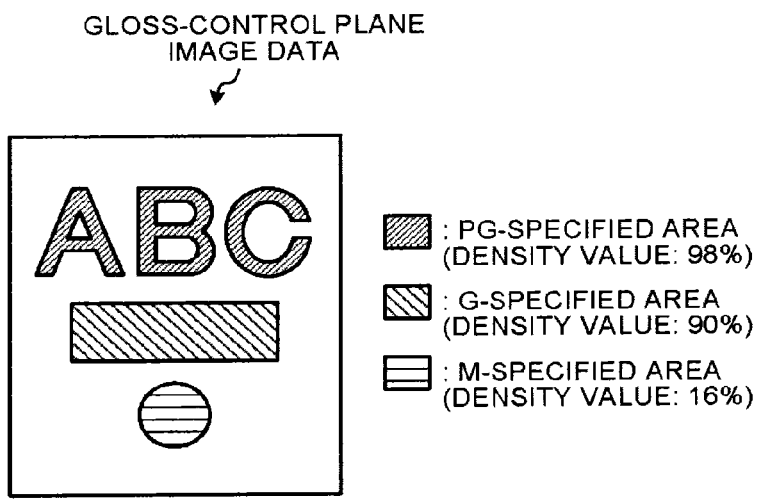
GLOSS-CONTROL PLANE IMAGE DATA
▨ : PG-SPECIFIED AREA (DENSITY VALUE: 98%)
▧ : G-SPECIFIED AREA (DENSITY VALUE: 90%)
☰ : M-SPECIFIED AREA (DENSITY VALUE: 16%)
FIG.11
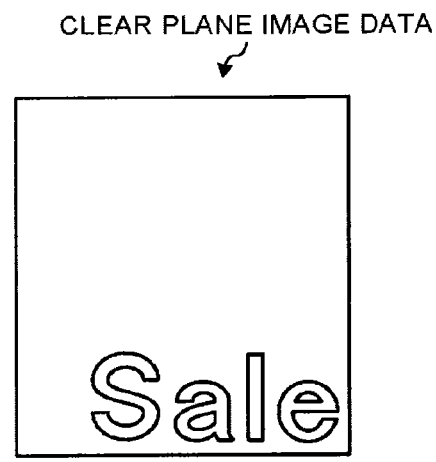
CLEAR PLANE IMAGE DATA

| TYPE OF SURFACE EFFECT SPECIFIED BY USER | DENSITY VALUE OF GLOSS-CONTROL PLANE (%) |
|---|---|
| PG | 98% |
| G | 90% |
| M | 16% |

| DRAWING OBJECT | COORDINATES | DENSITY VALUE |
|---|---|---|
| A, B, C | (x1, y1)-(x2, y2) | 98% |
| (RECTANGLE) | (x3, y3)-(x4, y4) | 90% |
| ... | ... | ... |

FIG.21

| DENSITY (%) | DENSITY VALUE | | | EFFECT | FORM | IN-SURED AMOUNT |
|---|---|---|---|---|---|---|
| | REPRE-SENT-ATIVE VALUE | VALUE RANGE | | | | |
| 98% | 250 | 248 | 255 | PREMIUM GLOSS TYPE A | HALFTONE 100% | 100% |
| 96% | 245 | 243 | 247 | PREMIUM GLOSS TYPE B | HALFTONE 80% | 80% |
| 94% | 240 | 238 | 242 | PREMIUM GLOSS TYPE C | HALFTONE 60% | 60% |
| 92% | 235 | 233 | 237 | RESERVED | | |
| 90% | 230 | 228 | 232 | GLOSS TYPE 1 | INVERSE MASK 1 | 0% |
| 88% | 224 | 222 | 227 | GLOSS TYPE 2 | INVERSE MASK 2 | 0% |
| 86% | 219 | 217 | 221 | GLOSS TYPE 3 | INVERSE MASK 3 | 0% |
| 84% | 214 | 212 | 216 | GLOSS TYPE 4 | INVERSE MASK 4 | 0% |
| 82% | 209 | 207 | 211 | RESERVED | | |
| 46% | 117 | 115 | 119 | RESERVED | | |
| 44% | 112 | 110 | 114 | WATERMARK CHARACTER 3 (SAMPLE) | TILE CHARACTER STRING 3 | 0% |
| 42% | 107 | 105 | 108 | WATERMARK CHARACTER 2 (COPY PROHIBITED) | TILE CHARACTER STRING 2 | 0% |
| 40% | 102 | 100 | 104 | WATERMARK CHARACTER 1 (SAMPLE) | TILE CHARACTER STRING 1 | 0% |
| 38% | 97 | 95 | 99 | RESERVED | | |
| 36% | 92 | 90 | 94 | BACKGROUND PATTERN 5 (SPHERE) | TILE BACKGROUND PATTERN 5 | 60% |
| 34% | 87 | 85 | 89 | BACKGROUND PATTERN 4 (SPHERE) | TILE BACKGROUND PATTERN 4 | 30% |
| 32% | 82 | 80 | 84 | BACKGROUND PATTERN 3 (CIRCLE) | TILE BACKGROUND PATTERN 3 | 30% |
| 30% | 76 | 74 | 79 | BACKGROUND PATTERN 2 (LATTICE) | TILE BACKGROUND PATTERN 2 | 30% |
| 28% | 71 | 69 | 73 | BACKGROUND PATTERN 1 (WAVE) | TILE BACKGROUND PATTERN 1 | 30% |
| 26% | 66 | 64 | 68 | RESERVED | | |
| 24% | 61 | 59 | 63 | TEXTURE PATTERN TYPE 3 (ROUGH) | TILE MESH PATTERN 3 | 100% |
| 22% | 58 | 54 | 58 | TEXTURE PATTERN TYPE 2 (MIDDLE) | TILE MESH PATTERN 2 | 100% |
| 20% | 51 | 49 | 53 | TEXTURE PATTERN TYPE 1 (FINE) | TILE MESH PATTERN 1 | 100% |
| 18% | 46 | 44 | 48 | RESERVED | | |
| 16% | 41 | 39 | 43 | MATT TYPE 4 | HALFTONE 40% | 0% |
| 14% | 38 | 34 | 38 | MATT TYPE 3 | HALFTONE 30% | 0% |
| 12% | 31 | 29 | 33 | MATT TYPE 2 | HALFTONE 20% | 0% |
| 10% | 25 | 23 | 28 | MATT TYPE 1 | HALFTONE 10% | 0% |
| 8% | 20 | 18 | 22 | RESERVED | | |
| 6% | 15 | 13 | 17 | RESERVED | | |
| 4% | 10 | 8 | 12 | RESERVED | | |
| 2% | 5 | 1 | 7 | RESERVED | | |
| 0% | 0 | 0 | 0 | NONE | | |

FIG.22

| OBJECT | PHOTO | TEXT | GRAPHICS |
|---|---|---|---|
| TOTAL RECORDING AMOUNT OF TONERS | 260% | 200% | 240% |

FIG.23

| OBJECT | | PHOTO | TEXT | GRAPHICS |
|---|---|---|---|---|
| HALFTONE PROCESSING (LINE FREQUENCY AND SHAPE, ANGLE) | C | 190-LINE HALFTONE, 72 DEGREES | 268-LINE HALFTONE, 153 DEGREES | 192-LINE HALFTONE, 27 DEGREES |
| | M | 190-LINE HALFTONE, 18 DEGREES | 268-LINE HALFTONE, 63 DEGREES | 192-LINE HALFTONE, 117 DEGREES |
| | Y | 200-LINE HALFTONE, 0 DEGREES | 268-LINE HALFTONE, 8 DEGREES | 192-LINE HALFTONE, 63 DEGREES |
| | K | 212-LINE HALFTONE, 45 DEGREES | 268-LINE HALFTONE, 116 DEGREES | 192-LINE HALFTONE, 153 DEGREES |
| | CLEAR | 171-LINE HALFTONE, 0 DEGREES | 282-LINE HALFTONE, 45 DEGREES | 200-LINE HALFTONE, 90 DEGREES |

IMAGE PROCESSING APPARATUS, IMAGE PROCESSING SYSTEM, AND IMAGE PROCESSING METHOD

CROSS-REFERENCE TO RELATED APPLICATIONS

The present application claims priority to and incorporates by reference the entire contents of Japanese Patent Application No. 2013-187761 filed in Japan on Sep. 10, 2013.

BACKGROUND OF THE INVENTION

1. Field of the Invention

The present invention relates to an image processing apparatus, an image processing system, and an image processing method.

2. Description of the Related Art

Recently, there has been proposed an image processing apparatus that uses a transparent color material (T), not including any pigment and dye, for purposes of gloss expression, surface protection, and the like, in addition to colorants such as cyan (C), magenta (M), yellow (Y), and black (K). On the other hand, there is a limit to a total amount of color materials such as ink and toner that an image processing apparatus can record on an image-recorded member. There is known a method of adjusting the total amount of color materials in order not to exceed the limit.

There are some methods as the method of adjusting the total amount of color materials. These are, for example, a method of adjusting an amount of colorants by giving priority to an amount of a transparent color material because of emphasis on reproducibility of an image using the transparent color material, a method of adjusting an amount of a transparent color material by giving priority to an amount of colorants because of emphasis on color reproducibility of an image using the colorants, and a method of adjusting a total amount of color materials by adopting an intermediate method between the two methods.

Japanese Patent Application Laid-open No. 2007-049338 discloses an invention of reducing an amount of color materials with respect to a transparent color material in a predetermined ratio, when adjusting the amount of the transparent color material, in an area where the total amount of color materials including the colorants and the transparent color material exceeds a limit.

However, the conventional method of adjusting the amount of the transparent color material is that of adjusting the amount of the transparent color material only in an area where the transparent color material exceeds the limit of the total amount of color materials. This therefore causes a significant difference between the area where the transparent color material exceeds the limit of the total amount of the color materials and an area where the transparent color material does not exceed the limit of the total amount of the color materials. That is, the conventional method of adjusting the amount of the transparent color material has a problem that a sense of unity, a gradation property, and the like as an entire image are easily lost when gloss is expressed by using the transparent color material.

In view of above conventional problems, there is a need to provide an image processing apparatus, image processing system, and an image processing method for adjusting an amount of a transparent color material without losing a sense of unity and a gradation property as an entire image.

SUMMARY OF THE INVENTION

It is an object of the present invention to at least partially solve the problems in the conventional technology.

According to the present invention, there is provided an image processing apparatus comprising: a first generating unit that generates chromatic color material image data representing a recording amount of a chromatic color material in each pixel of an image from first image data indicating the image formed by using the chromatic color material; a second generating unit that generates transparent color material image data representing a recording amount of a transparent color material in each pixel of an image from second image data indicating the image formed by using the transparent color material; a storage unit that stores a total recording amount of color materials indicating an upper limit of the recording amount of the color materials and a maximum recording amount of the transparent color material indicating an upper limit of a recording amount assignable to the transparent color material, for color material image data indicating an image formed from the chromatic color material image data and the transparent color material image data; and a correcting unit that calculates a recording amount assignable to the transparent color material by subtracting the recording amount of the chromatic color material from the total recording amount of color materials, and corrects the recording amount of the transparent color material in each pixel of the transparent color material image data based on a ratio between the recording amount assignable to the transparent color material and the maximum recording amount of the transparent color material.

The present invention also provides an image processing system comprising: an image processing apparatus and a server device, wherein the image processing apparatus includes: a first generating unit that generates chromatic color material image data representing a recording amount of a chromatic color material in each pixel of an image from first image data indicating the image formed by using the chromatic color material; and a second generating unit that generates transparent color material image data representing a recording amount of a transparent color material in each pixel of an image from second image data indicating the image formed by using the transparent color material, and the server device includes: a storage unit that stores a total recording amount of color materials indicating an upper limit of a recording amount of the color materials and a maximum recording amount of the transparent color material indicating an upper limit of the recording amount assignable to the transparent color material, for color material image data indicating an image formed from the chromatic color material image data and the transparent color material image data; and a correcting unit that calculates a recording amount assignable to the transparent color material by subtracting the recording amount of the chromatic color material from the total recording amount of color materials, and corrects the recording amount of the transparent color material in each pixel of the transparent color material image data based on a ratio between the recording amount assignable to the transparent color material and the maximum recording amount of the transparent color material.

The present invention also provides an image processing method executed by an image processing apparatus, the method comprising: a step of generating chromatic color material image data representing a recording amount of a chromatic color material in each pixel of an image from first image data indicating the image formed by using the chromatic color material; a step of generating transparent color material image data representing a recording amount of a transparent color material in each pixel of an image from second image data indicating the image formed by using the transparent color material; a step of referring to a total recording amount of color materials indicating an upper limit of the recording amount of the color materials and to a maximum recording amount of the transparent color material indicating an upper limit of a recording amount assignable to the transparent color material, for color material image data indicating an image that is formed from the chromatic color material image data and the transparent color material image data; and a step of calculating a recording amount assignable to the transparent color material by subtracting the recording amount of the chromatic color material from the total recording amount of color materials, and correcting the recording amount of the transparent color material in each pixel of the transparent color material image data based on a ratio of the recording amount assignable to the transparent color material and the maximum recording amount of the transparent color material.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a diagram illustrating an example of types of surface effects relating to the presence or absence of gloss according to the third embodiment;

FIG. 10 is a diagram illustrating an example of gloss-control plane image data according to the third embodiment;

FIG. 11 is an explanatory diagram illustrating an example of clear plane image data according to the third embodiment;

FIG. 21 is a diagram illustrating an example of a surface effect selection table according to the third embodiment;

FIG. 22 is a diagram illustrating an example of a total recording amount of toners defined for each object;

FIG. 23 is a diagram illustrating an example of a halftone processing selection table according to the third embodiment;

DETAILED DESCRIPTION OF THE PREFERRED EMBODIMENTS

Exemplary embodiments of an image processing apparatus, an image processing system, and an image processing method will be explained in detail below with reference to the accompanying drawings.

First Embodiment

Figure 1:
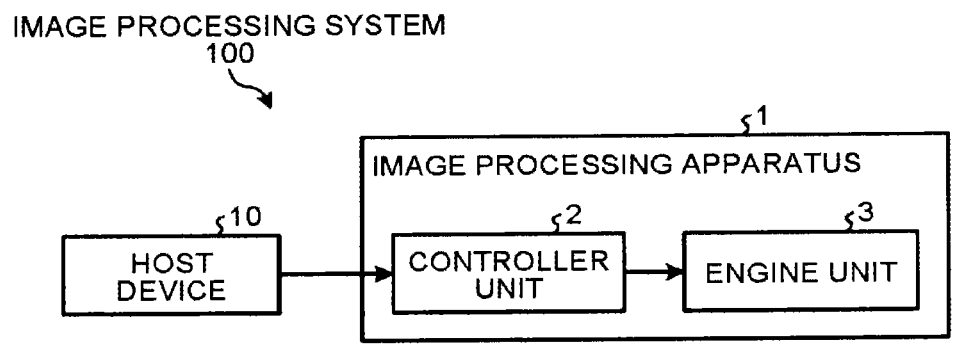
FIG. 1 is a diagram illustrating a configuration example of an image processing system according to a first embodiment of the present invention.

FIG. 1 is a diagram illustrating a configuration example of an image processing system 100 according to a first embodiment of the present invention. The image processing system 100 according to the present embodiment includes an image processing apparatus 1 and a host device 10. The image processing apparatus 1 and the host device 10 are communicably linked to each other by wired or wireless connections. The host device 10 transmits image data to the image processing apparatus 1. The image processing apparatus 1 includes a controller unit 2 and an engine unit 3. The controller unit 2 receives the image data from the host device 10, performs image processing on the received image data, generates color material image data, and transmits the color material image data to the engine unit 3. The color material image data is data representing a recording amount of color materials of each pixel in an image to be printed. The color material image data includes chromatic color material image data and transparent color material image data. Details of the chromatic color material image data and the transparent color material image data will be explained later. The engine unit 3 receives the color material image data from the controller unit 2 and records an image corresponding to the color material image data on a recording medium such as a paper sheet.

Figure 2:
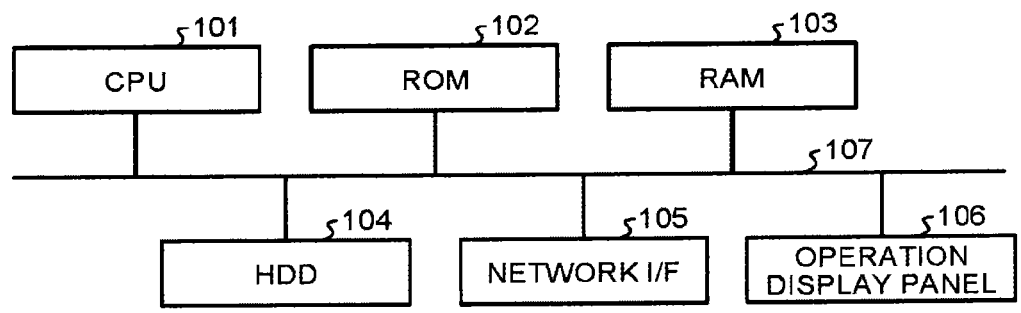
FIG. 2 is a diagram illustrating a hardware configuration example of a controller unit in an image processing apparatus according to the first embodiment.

FIG. 2 is a diagram illustrating a hardware configuration example of the controller unit 2 in the image processing apparatus 1 according to the first embodiment.

The controller unit 2 includes a central processing unit (CPU) 101, a read-only memory (ROM) 102, a random access memory (RAM) 103, a hard disk drive (HDD) 104, a network interface (I/F) 105, an operation display panel 106, and a bus 107. The CPU 101, the ROM 102, the RAM 103, the HDD 104, the network I/F 105, and the operation display panel 106 are connected to each other via the bus 107.

The CPU 101 executes a program. The ROM 102 stores a system activation program and the like. The system activation program is a program that activates a system program for controlling the system of the image processing apparatus 1. The RAM 103 is a memory used when the CPU 101 executes the program. The HDD 104 is an auxiliary storage device of the image processing apparatus 1. The HDD 104 stores application programs such as an image processing program used when the image processing apparatus 1 processes an image, a system program of the image processing apparatus 1, various data, and the like. The HDD 104 may be an optical drive, a flash memory, or the like. A recording medium from or to which the optical drive reads or write data is a compact disk read only memory (CD-ROM), a compact disk recordable (CD-R), a digital versatile disk (DVD), and the like. The network I/F 105 transmits/receives various pieces of information to/from an external device such as the host device 10. The operation display panel 106 receives an operation input from a user.

It may be configured so that the programs stored in the ROM 102 are provided by being recorded in a computer-readable recording medium such as CD-ROM, CD-R, DVD as a file in an installable format or in an executable format.

Figure 3:
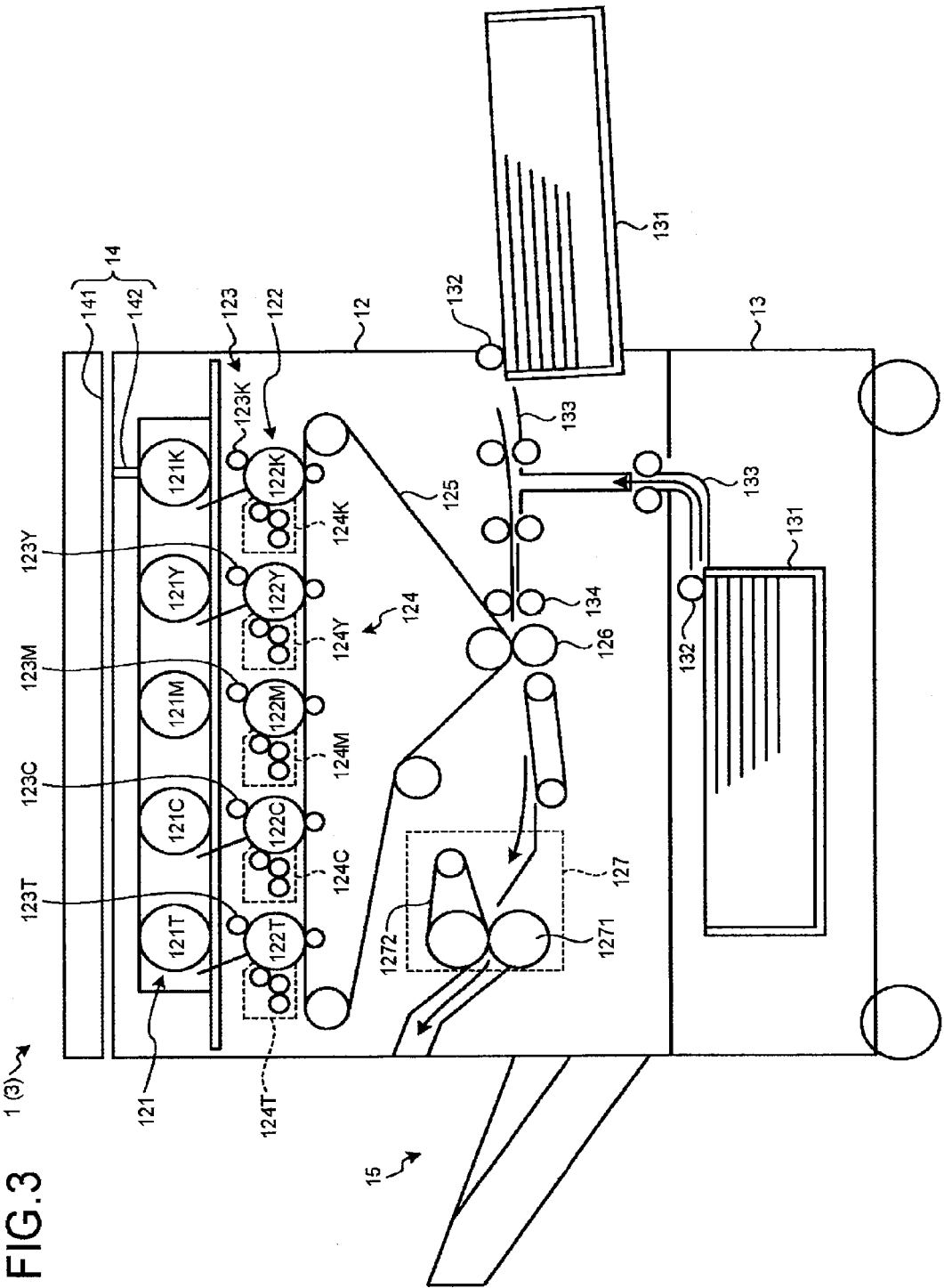
FIG. 3 is a diagram illustrating a hardware configuration example of an engine unit in the image processing apparatus according to the first embodiment.

FIG. 3 is a diagram illustrating a hardware configuration example of the engine unit 3 in the image processing apparatus 1 according to the first embodiment. The engine unit 3 according to the present embodiment includes a printer unit 12, a sheet feeding unit 13, a scanner unit 14, and a sheet ejecting unit 15.

The printer unit 12 includes a cartridge 121, a photoconductor drum 122, a charging unit 123, a developing unit 124, an intermediate transfer belt 125, a secondary transfer roller 126, and a fixing unit 127. The fixing unit 127 includes a pressure roller 1271 and a fixing belt 1272.

The cartridge 121 includes five cartridges 121C, 121M, 121Y, 121K, and 121T. The four cartridges 121C, 121M, 121Y, and 121K store chromatic color materials. The chromatic color material is, for example, color toner. The cartridge 121C stores a color material of cyan (C). The cartridge 121M stores a color material of magenta (M). The cartridge 121Y stores a color material of yellow (Y). The cartridge 121K stores a color material of black (K). The cartridge 121T stores a transparent (T) color material. The transparent color material according to the present embodiment is an achromatic and transparent color material which is generated from resin that does not include a colorant. The transparent color material is, for example, clear toner. Any one of the cartridges 121C, 121M, 121Y, 121K, and 121T is hereinafter referred to collectively as "cartridge 121".

The photoconductor drum 122 includes five photoconductor drums 122C, 122M, 122Y, 122K, and 122T corresponding to types of the color materials of C color, M color, Y color, K color, and T, respectively. Any one of the photoconductor drums 122C, 122M, 122Y, 122K, and 122T is hereinafter referred to collectively as "photoconductor drum 122". The photoconductor drum 122 is uniformly charged by the charging unit 123, explained later, and then an electrostatic latent image corresponding to color material image data received from the controller unit 2 is formed on the surface of the photoconductor drum 122. The developing unit 124, explained later, attaches a color material to the electrostatic latent image formed on the surface of the photoconductor drum 122, thus forming an image.

The charging unit 123 includes five charging units 123C, 123M, 123Y, 123K, and 123T corresponding to the types of the color materials of C color, M color, Y color, K color, and T, respectively. Any one of the charging units 123C, 123M, 123Y, 123K, and 123T is hereinafter referred to collectively as "charging unit 123". The charging unit 123 is applied with a voltage and charges the surface of the photoconductor drum 122.

The developing unit 124 includes five developing units 124C, 124M, 124Y, 124K, and 124T corresponding to the types of the color materials of C color, M color, Y color, K color, and T, respectively. Any one of the developing units 124C, 124M, 124Y, 124K, and 124T is hereinafter referred to collectively as "developing unit. 124". The developing unit 124 causes the color material of the cartridge 121 to adhere to the photoconductor drum 122 charged by the charging unit 123, thus forming an image on the surface of each of the photoconductor drums 122.

The intermediate transfer belt 125 is conveyed while abutting on the photoconductor drum 122. The image formed on the photoconductor drum 122 is thereby transferred to the intermediate transfer belt 125.

The secondary transfer roller 126 sandwiches a recording medium conveyed from the sheet feeding unit 13, explained later, with the intermediate transfer belt 125, transfers the image formed on the intermediate transfer belt 125 to the recording medium, and feeds the recording medium having the image formed thereon in the fixing unit 127.

The fixing unit 127 includes the pressure roller 1271 and the fixing belt 1272. The fixing unit 127 fixes the image on the recording medium conveyed from the secondary transfer roller 126. The pressure roller 1271 presses the recording medium against the fixing belt 1272, applies heat thereto, and causes color materials to adhere to the recording medium, thus fixing the image. The fixing belt 1272 presses the recording medium against the pressure roller 1271, thus fixing the image on the recording medium.

Subsequently, the hardware configuration of the sheet feeding unit 13 will be explained below. The sheet feeding unit 13 includes a sheet feeding tray 131, a sheet feeding roller 132, a sheet feeding belt 133, and a registration roller 134. The sheet feeding unit 13 feeds a recording medium such as a paper sheet to the printer unit 12.

The sheet feeding tray 131 stores recording media such as paper sheets. The sheet feeding roller 132 takes out a sheet stored in the sheet feeding unit 13 to place the sheet on the sheet feeding belt 133. The sheet feeding belt 133 feeds the sheet and puts the sheet into the registration roller 134. The registration roller 134 feeds the sheet in between the intermediate transfer belt 125 and the secondary transfer roller 126.

The scanner unit 14 includes a contact class 141 and a reading sensor 142. The scanner unit 14 reads image information written on the sheet or the like. The sheet with the image written thereon is placed on the contact glass 141. The reading sensor 142 reads the image information from the image written on the sheet placed on the contact glass 141.

The sheet ejecting unit 15 ejects the recording medium with the image fixed thereon by the fixing unit 127 and stores the ejected recording medium.

Figure 4:
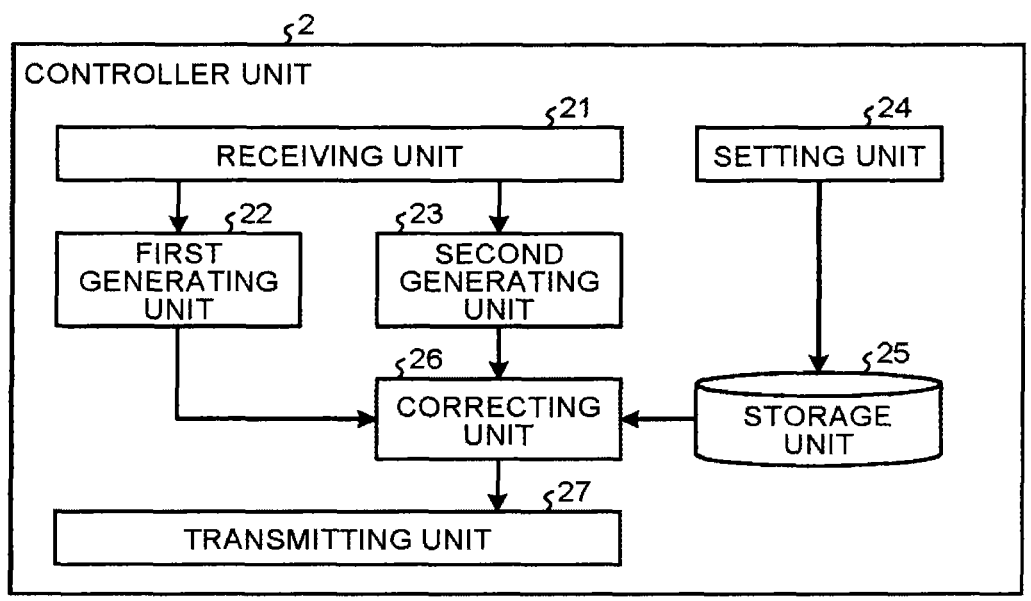
FIG. 4 is a block diagram of the controller unit in the image processing apparatus according to the first embodiment.

FIG. 4 is a block diagram of the controller unit 2 in the image processing apparatus 1 according to the first embodiment. The controller unit 2 according to the present embodiment includes a receiving unit 21, a first generating unit 22, a second generating unit 23, a setting unit 24, a storage unit 25, a correcting unit 26, and a transmitting unit 27.

The receiving unit 21 receives first image data and second image data from the host device 10. The first image data indicates an image formed by using a chromatic color material. The first image data is information representing an image to be formed by using a colorant on an image-recorded medium such as a paper sheet, and is data in a bitmap format or data in a vector format expressed by a color display format such as RGB and CMYK and by a gray-scale format of a single color. The second image data indicates an image formed by using a transparent color material. The second image data is information representing an image to be formed by using a transparent color material on an image-recorded medium such as a paper sheet, and is data in the bitmap format or data in the vector format expressed by the gray-scale format of a single color. The receiving unit 21 transmits the first image data to the first generating unit 22. The receiving unit 21 transmits the second image data to the second generating unit 23.

The first generating unit 22 generates chromatic color material image data representing a recording amount of a chromatic color material of each pixel in each color of the chromatic color materials, from the first image data. The chromatic color material image data is, for example, data representing a recording amount of a colorant such as CMYK of each pixel in the bitmap format. The first generating unit 22 transmits the chromatic color material image data to the correcting unit 26.

The second generating unit 23 generates transparent color material image data representing a recording amount of a transparent color material of each pixel, from the second image data. The second generating unit 23 transmits the transparent color material image data to the correcting unit 26. The transparent color material image data is, for example, data representing a recording amount of a transparent color material of each pixel in the bitmap format.

In the explanation of the image processing apparatus 1 according to the present embodiment, the recording amount of the chromatic color material or the recording amount of the transparent color material is expressed by using a halftone area ratio. Therefore, a possible value range of the recording amount of each color material is 0% to 100%. However, in the image processing apparatus 1 according to the embodiment of the present application, the range is not limited to 0% to 100%. For example, the recording amount of a colorant or the recording amount of a transparent color material is expressed with 8 bits, and therefore a possible value range of the recording amount of respective color materials may be 0 to 255.

For a color material recording amount in color material image data in which a chromatic color material recording amount in chromatic color material image data and a transparent color material recording amount in transparent color material image data are combined, the setting unit 24 sets a total recording amount of color materials indicating an upper limit of the recording amount of color materials and a maximum recording amount of a transparent color material indicating an upper limit of the recording amount assignable to the transparent color material in the image processing apparatus 1. The storage unit 25 stores therein the total recording amount of color materials and the maximum recording amount of a transparent color material which are set in the image processing apparatus 1 by the setting unit 24. The total recording amount of color materials is, for example, 260%. The maximum recording amount of a transparent color material is, for example, 100%.

The total recording amount of color materials set by the setting unit 24 may be set by the user performing an operation input through the operation display panel 106. Moreover, the setting unit 24 may previously store a table for determining a total recording amount according to a type of an image-recorded member in the storage unit 25 to determine a total recording amount according to a type of an image-recorded member.

The correcting unit 26 receives the chromatic color material image data from the first generating unit 22. The correcting unit 26 also receives the transparent color material image data from the second generating unit 23. The correcting unit 26 reads the total recording amount of color materials and the maximum recording amount of the transparent color material from the storage unit 25. The correcting unit 26 corrects the recording amount of the transparent color material of each pixel in the transparent color material image data based on the chromatic color material recording amount of the chromatic color material image data, the total recording amount of color materials, and the maximum recording amount of the transparent color material. The chromatic color material recording amount is a recording amount of respective color materials of cyan (C), magenta (M), yellow (Y), and black (K).

Specifically, for each pixel in the color material image data, the correcting unit 26 according to the present embodiment corrects the recording amount of the transparent color material by the following Equation (1).

(Recording amount of transparent color material after correction)=(Recording amount of transparent color material before correction)×{$T$max/(Maximum recording amount of transparent color material)} (1)

Here, Tmax is defined by the following Equation (2).

$T$max=(Total recording amount of color materials)−(Recording amount of chromatic color material) (2)

If Tmax<0, then Tmax=0 is set, and if Tmax≥(Maximum recording amount of transparent color material), then Tmax=(Maximum recording amount of transparent color material) is set. Tmax is hereinafter referred to as "recording amount assignable to the transparent color material".

Figure 5A:
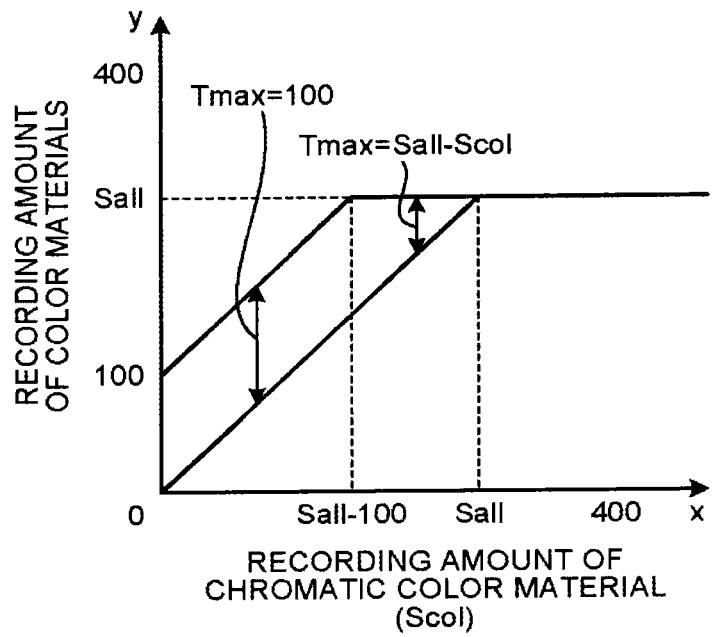
FIG. 5A is a diagram illustrating an example of a recording amount assignable to a transparent color material (Tmax) according to the first embodiment.
Figure 5B:
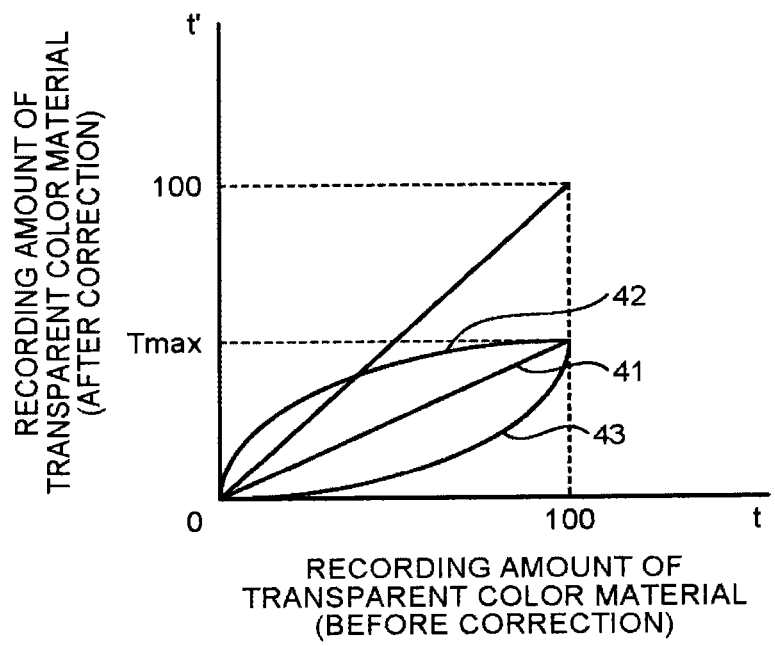
FIG. 5B is a diagram illustrating an example of how a correcting unit according to the first embodiment corrects a recording amount of the transparent color material.

FIG. 5A is a diagram illustrating an example of the recording amount assignable to the transparent color material (Tmax) according to the first embodiment. FIG. 5B is a diagram illustrating an example of how the correcting unit 26 according to the first embodiment corrects the recording amount of the transparent color material.

First, FIG. 5A is explained. An x-axis of FIG. 5A represents a recording amount of chromatic color materials (Scol). A y-axis of FIG. 5A represents a recording amount of color materials. "Sall" represents a total recording amount of color materials. In the example of FIG. 5A, the maximum recording amount of the transparent color material is set to 100%.

When Recording amount of chromatic color materials (Scol)≤Total recording amount of color materials (Sall)−100, then Recording amount assignable to transparent color material (Tmax)=100%.

When Total recording amount of color materials (Sall)−100<Recording amount of chromatic color materials (Scol)

≤Total recording amount of color materials (Sall), then Recording amount assignable to transparent color material (Tmax)=Total recording amount of color materials (Sall)−Recording amount of chromatic color materials (Scol)(%).

When Recording amount of chromatic color materials (Scol)>Total recording amount of color materials (Sall), then Recording amount assignable to transparent color material (Tmax)=0(%).

Next, FIG. 5B is explained. An x-axis of FIG. 5B represents a recording amount of the transparent color material t (%) before correction. A y-axis of FIG. 5B represents a recording amount of the transparent color material t'(%) after correction. A value 100 in FIG. 5B represents the maximum recording amount of the transparent color material. A function 41 represents a case in which the recording amount of the transparent color material t is corrected to the recording amount of the transparent color material t' by using Equation (1). The function 41 representing Equation (1) is linear transformation. However, the equation used to correct a recording amount of the transparent color material of each pixel in the transparent color material image data based on the recording amount of a chromatic color material of the chromatic color material image data, the total recording amount of color materials, and based on the maximum recording amount of the transparent color material is not limited to Equation (1), and therefore the equation may be a nonlinear equation represented by a function 42 and a function 43.

Referring back to FIG. 4, the correcting unit 26 transmits the chromatic color material image data and the corrected transparent color material image data to the transmitting unit 27. When receiving the chromatic color material image data and the corrected transparent color material image data from the correcting unit 26, the transmitting unit 27 transmits the chromatic color material image data and the corrected transparent color material image data to the engine unit 3. The engine unit 3 then records the image according to the chromatic color material image data and the corrected transparent color material image data on the recording medium such as a paper sheet.

The image processing apparatus 1 according to the present embodiment can adjust the amount of a transparent color material without losing the sense of unity and a gradation property as an entire image because the correcting unit 26 corrects the recording amount of the transparent color material (see FIG. 5B) to within a range of the recording amount assignable to the transparent color material (Tmax) regardless of whether or not the recording amount of the transparent color material exceeds the recording amount assignable to the transparent color material (Tmax).

Second Embodiment

An image processing system 100 according to a second embodiment will be explained next. The configuration of the image processing system 100 according to the present embodiment is the same as that of the image processing system 100 according to the first embodiment, and therefore the explanation thereof is omitted herein. The hardware configurations of a controller unit 2 and an engine unit 3 of the image processing system 100 according to the present embodiment are also the same as these of the image processing system 100 according to the first embodiment, and therefore the explanation thereof is omitted herein.

Figure 6:
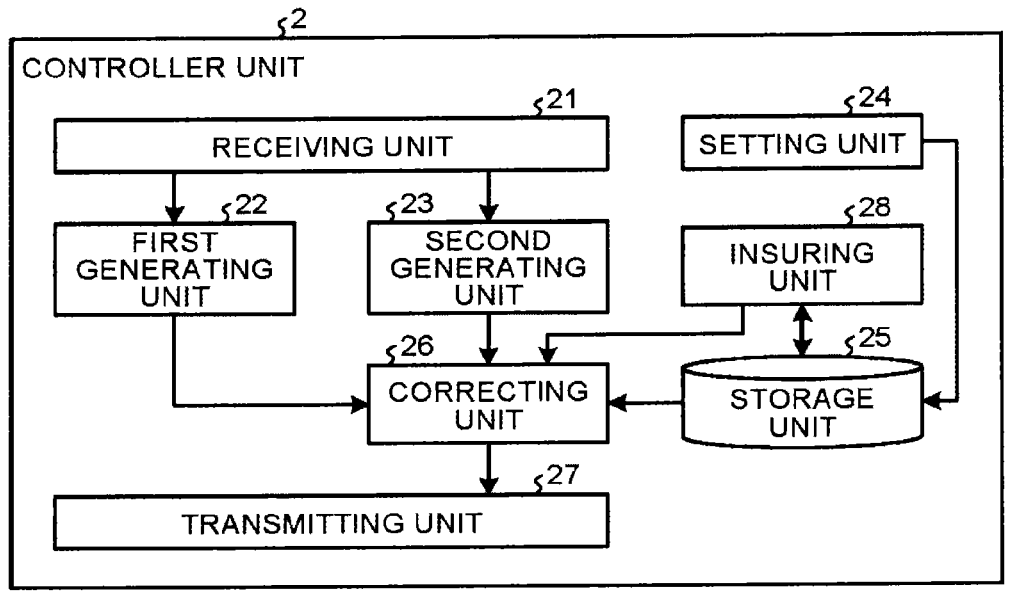
FIG. 6 is a block diagram of a controller unit in an image processing apparatus according to a second embodiment of the present invention.

FIG. 6 is a block diagram of the controller unit 2 in the image processing apparatus 1 according to the second embodiment. The controller unit 2 in the image processing apparatus 1 according to the present embodiment is configured to add an insuring unit 28 to the configuration of the controller unit 2 in the image processing apparatus 1 according to the first embodiment. In the present embodiment, some portions different from the first embodiment are explained.

The insuring unit 28 reads an insured amount of the recording amount assignable to the transparent color material (Tmax) from the storage unit 25 and transmits the insured amount to the correcting unit 26. The insured amount of the recording amount assignable to the transparent color material is a lower limit used to determine the recording amount assignable to the transparent color material in order that the recording amount of color materials does not exceed the total recording amount of color materials. For example, when the maximum recording amount of the transparent color material is 100% and the insured amount is 100%, then the correcting unit 26 always sets Recording amount assignable to the transparent color material (Tmax)=Maximum recording amount of transparent color material=100%. This case corresponds to a case where the correcting unit 26 gives first priority to the recording amount of the transparent color material.

When the maximum recording amount of the transparent color material is 100% and the insured amount is 50%, then the correcting unit 26 can lower the recording amount assignable to the transparent color material (Tmax) to 50% in order that the recording amount of color materials does not exceed the total recording amount of color materials. This case corresponds to a case where the correcting unit 26 corrects the recording amount of the transparent color material and the recording amount of the chromatic color material to the same level.

When the maximum recording amount of the transparent color material is 100% and the insured amount is 0%, then the correcting unit 26 can lower the recording amount assignable to the transparent color material (Tmax) to 0% in order that the recording amount of color materials does not exceed the total recording amount of color materials. This case corresponds to a case where the correcting unit 26 gives first priority to the recording amount of a chromatic color material.

The insuring unit 28 may receive an insured amount from the user through the operation display panel 106 instead of reading the insured amount previously stored in the storage unit 25.

The correcting unit 26 receives the chromatic color material image data from the first generating unit 22. The correcting unit 26 also receives the transparent color material image data from the second generating unit 23. The correcting unit 26 reads the total recording amount of color materials and the maximum recording amount of the transparent color material from the storage unit 25. The correcting unit 26 receives the insured amount of the transparent color material image data from the insuring unit 28. The correcting unit 26 corrects, in the same manner as that of the correcting unit 26 according to the first embodiment, the recording amount of the transparent color material of each pixel in the transparent color material image data based on the recording amount of the chromatic color material in the chromatic color material image data, the total recording amount of color materials, and the maximum recording amount of the transparent color material. When correcting the recording amount of the transparent color material in each pixel after the correction, and if the recording amount assignable to the transparent color material (Tmax) used in Equation (1) is smaller than the insured amount of the recording amount assignable to the transparent color material (Tmax), then the correcting unit 26 corrects Tmax. Specifically, when Tgau is the maximum recording amount of the transparent color material, the correcting unit 26 corrects the recording amount assignable to the transparent color material Tmax by, for example, setting Tmax'=Tgau if Tgau>Tmax and setting Tmax'=Tmax if Tgau≤Tmax.

The correcting unit 26 uses the recording amount assignable to the transparent color material Tmax' to correct the recording amount of the transparent color material t to the recording amount of the transparent color material t' by using Equation (1).

When the recording amount assignable to the transparent color material is set to Tmax' and if the combined color material recording amount between the recording amount of the corrected transparent color material and the recording amount of the chromatic color material is greater than the total recording amount of color materials, the correcting unit 26 corrects so as to reduce the recording amount of the chromatic color material. The correcting unit 26 corrects the recording amount of the chromatic color material based on the recording amount of the corrected transparent color material t' and the total recording amount of color materials. Specifically, for example, the correcting unit 26 corrects each recording amount of respective chromatic color materials by the following Equation (3).

If Sall<t'+Scol, $$k'=k$$

$$c'=c\times(\text{Sall}-t')/\text{Scol}$$

$$m'=m\times(\text{Sall}-t')/\text{Scol}$$

$$y'=y\times(\text{Sall}-t')/\text{Scol} \quad (3)$$

If Sall≥t'+Scol,
k'=k
c'=c
m'=m
y'=y

Where Sall is a total recording amount of color materials, k is a recording amount of a color material of black (K), c is a recording amount of a color material of cyan (C), m is a recording amount of a color material of magenta (M), y is a recording amount of a color material of yellow (Y), and Scol is a recording amount of the chromatic color materials (k+c+m+y).

In Equation (3), the reason why the recording amount of the color material of black (K) is not corrected is because reduction in the recording amount of the color material of black (K) causes a difference between the images before the correction and after the correction to easily come up and a large influence is thereby exerted on the images. Equation (3) is only an example of a correction equation, and therefore the correcting unit 26 may correct a recording amount of the chromatic color material using an arbitrary correction equation instead of using Equation (3).

The image processing apparatus 1 according to the present embodiment is configured to insure the lower limit of the recording amount assignable to the transparent color material, not to reduce the recording amount of the transparent color material too much, and to enable adjustment of the amount of the transparent color material without losing a sense of unity and a gradation property as an entire image.

Third Embodiment

An image processing system 100 according to a third embodiment of the present invention will be explained next. In the explanation according to the present embodiment, the chromatic color material is described as color toner and the transparent color material is described as clear toner. However, the color material is not limited to the toner and may therefore be any color material.

Figure 7:
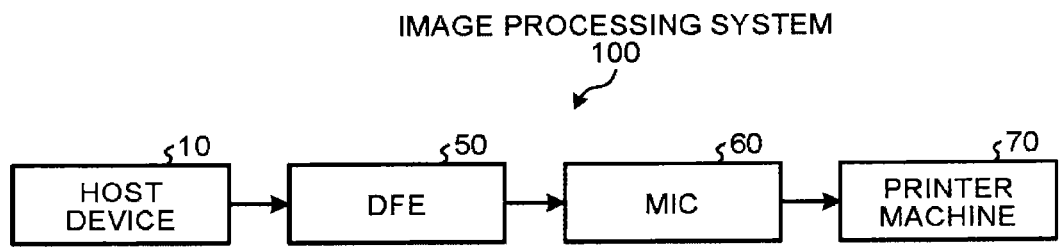
FIG. 7 is a diagram illustrating a configuration example of an image processing system according to a third embodiment of the present invention.

First, the configuration of the image processing system 100 according to the present embodiment will be explained below. FIG. 7 is a diagram illustrating a configuration example of the image processing system 100 according to the third embodiment. The image processing system 100 according to the present embodiment includes a printer control device (digital front end (DFE)) 50 (hereinafter, "DFE 50"), an interface controller (mechanism I/F controller (MIC)) 60 (hereinafter, "MIC 60"), and a printer machine 70.

The host device 10 is a device that transmits image data (print data explained later) to the DFE 50. The host device 10 is, for example, a personal computer (PC). The DFE 50 communicates with the printer machine 70 via the MIC 60 and controls the printer machine 70 to form an image. The DFE 50 receives the image data from the host device 10. The DFE 50 generates color toner image data representing a recording amount of a color toner of each pixel in the image and clear toner image data representing a recording amount of a clear toner of each pixel in the image from the received image data. The DFE 50 transmits the color toner image data and the clear toner image data to the printer machine 70 via the MIC 60. The printer machine 70 receives the color toner image data and the clear toner image data from the DFE 50 via the MIC 60.

The printer machine 70 includes a cartridge, an image forming unit, an exposing unit, and a fixing unit. The image forming unit includes a photoconductor, a charger, a developing device, and a photoconductor cleaner. The cartridge stores four color toners of CMYK and a clear toner. In the present embodiment, the color toner is a color toner in respective colors of CMYK. The clear toner is a transparent (achromatic) toner without any color material. The "transparent (achromatic)" indicates, for example, a transmittance of 70% or more.

The printer machine 70 forms an image according to the color toner image data and the clear toner image data received from the DFE 50 via the MIC 60 on a recording medium such as a transfer sheet. Specifically, the printer machine 70 causes the charger to charge the photoconductor and forms a toner image on the photoconductor with a light beam irradiated from the exposing unit. The printer machine 70 transfers the toner image to the recording medium, causes the fixing unit to heat and pressure the recording medium at a temperature (normal temperature) within a predetermined range, and fixes the toner image on the recording medium. The printer machine 70 thereby forms an image on the recording medium. The configuration of the printer machine 70 is known, and therefore detailed explanation thereof is omitted herein.

The image data (document data) that the DFE 50 receives from the host device 10 will be explained below. The host device 10 generates image data by a previously installed image processing application (an image processing unit 212, a plane data generating unit 214, a print data generating unit 215, and the like, which are explained later), and transmits the image data to the DFE 50. The image processing application can handle not only image data, in which a value of density (called density value) for each color in respective color planes of RGB planes and CMYK planes is defined in each pixel, but also special-color plane image data. The special-color plane image data is image data for attaching special toners and inks such as white, gold, and silver to an image in addition to basic colors such as CMYK and RGB, and is data targeted for a printer that includes such special toners and inks. To improve color reproducibility, R as a special color can be added to the CMYK basic colors or Y as a special color can be added to the RGB basic colors. In general, the clear toner is also handled as one of the special colors.

The image processing system 100 according to the present embodiment uses the clear toner as a special color in order to form a surface effect which is a visual effect or a tactile effect applied to a transfer sheet and to form a transparent image such as a watermark and texture other than the surface effects.

Therefore, for the input image data, the image processing application of the host device 10 generates any one or both of the gloss-control plane image data and the clear plane image data by user specification as the special-color plane image data in addition to the color plane image data.

The color plane image data, the gloss-control plane image data, and the clear plane image data are explained below.

Figure 8:
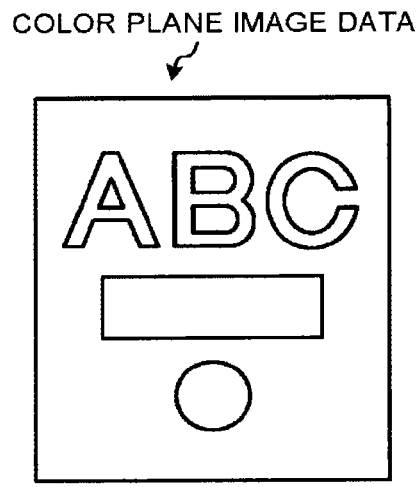
FIG. 8 is a diagram illustrating an example of color plane image data according to the third embodiment.

FIG. 8 is a diagram of an example of the color plane image data. The color plane image data is image data in which a density value of respective colors such as RGB and CMYK is defined in each pixel. An image indicated by the color plane image data is formed by using color toners. The color plane image data expresses the density value of a chromatic color in one pixel with 8 bits for each basic color according to the color specified by the user. For example, when the density value of a chromatic color in one pixel is expressed by using RGB, R is expressed with 8 bits, G is expressed with 8 bits, and B is expressed with 8 bits. In the example of FIG. 8, a density value corresponding to a color specified by the user using the image processing application is applied to each drawing object such as "A", "B", and "C".

The gloss-control plane image data is image data specifying a type of a surface effect being a visual effect or a tactile effect applied to a transfer sheet. The image indicated by the gloss-control plane image data is formed by using a clear toner.

Similar to the color plane image data representing an image using RGB, CMYK, or the like, the gloss-control plane image data represents an image using a density value in a range of "0" to "255" with 8 bits for each pixel. However, in the gloss-control plane image data, the type of the surface effect is associated with the density value (the density value may be expressed by 16 bits, 32 bits, or 0 to 100%).

The same value is set in a range to which the same surface effect is desired to be applied regardless of the density of the clear toner that actually adheres, and therefore an area can be easily specified from the image data as necessary even if there is no data indicating the area. In other words, the type of the surface effect and the area to which the surface effect is applied are represented by the gloss-control plane (the data representing the area may be separately applied).

The host device 10 sets the type of the surface effect for the drawing object specified by the user using the image processing application as the density value indicating the surface effect such as gloss for each drawing object, and generates gloss-control plane image data (gloss-control plane data) in a vector format.

Each of pixels forming the gloss-control plane image data corresponds to a pixel of the color plane image data. In each image data, the density value indicating each pixel is a pixel value. Moreover, both of the color plane image data and the gloss-control plane image data are formed in a page unit.

The types of the surface effects are roughly classified into those relating to the presence or absence of gloss, surface protection, watermarks in which information is embedded, textures, or the like. The surface effect relating to the presence or absence of gloss will be explained below.

FIG. 9 is a diagram illustrating an example of the types of surface effects relating to the presence or absence of gloss. In the example of FIG. 9, there are three major types of the surface effects relating to the presence or absence of gloss, which are specular gloss as Premium Gloss (PG), solid gloss as Gloss (G), and halftone matte as Matt (M) in a descending order of the degree of gloss (glossiness). Hereinafter, the specular gloss is referred to as "PG", the solid gloss is referred to as "G", and the halftone matte is referred to as "M".

The PG and the G apply a high degree of gloss. On the other hand, the M is used to suppress gloss. As illustrated in FIG. 9, the PG represents a glossiness Gs of 80 or higher, the G represents a solid glossiness made by a primary color or a secondary color, and the M represents a glossiness made by a primary color and has a glossiness of 30% halftone. The deviation in glossiness is represented by ΔGs and is set to 10 or less. A higher density value corresponds to a surface effect that requires a higher degree of gloss, and a lower density value corresponds to a surface effect that suppresses gloss. An intermediate density value corresponds to a surface effect such as a watermark and texture.

The watermark is, for example, a character and a background pattern. The texture represents a character and a pattern, and can apply a tactile effect in addition to a visual effect. The texture is, for example, a pattern of a stained glass. The surface protection is substituted by the PG or the G. An area of an image applied with the surface effect or a type of the surface effect applied to the area are specified by the user via the image processing application. The host device 10 that executes the image processing application generates gloss-control plane image data by setting a density value corresponding to the surface effect specified by the user for each drawing object forming the area specified by the user. A correspondence relation between the density values and the types of the surface effects will be explained later.

FIG. 10 is a diagram illustrating an example of gloss-control plane image data. In the example of a gloss-control plane in FIG. 10, the user applies the surface effect "PG (Premium Gloss)" to a drawing object "ABC", the surface effect "G (Gloss)" to a drawing object "rectangle", and the surface effect "M (Matt)" to a drawing object "circle". The density value set in each surface effect is a density value defined in association with the type of the surface effect in a density value selection table explained later (see FIG. 15).

FIG. 11 is an explanatory diagram of an example of clear plane image data. The clear plane image data is image data indicating a transparent image such as a watermark and texture other than the surface effects. An image indicated by the clear plane image data is formed by using a clear toner. The example of FIG. 11 represents a watermark "Sale".

The host device 10 generates special-color plane image data (gloss-control plane image data and clear plane image data) in a plane different from the color plane image data using the image processing application. The host device 10 represents the color plane image data, the gloss-control plane image data, and the clear plane image data in a Portable Document Format (PDF), and integrates PDF image data of the planes to generate document data. The data format of the image data of each plane is not limited to PDF and may therefore be an arbitrary format.

Figure 12:
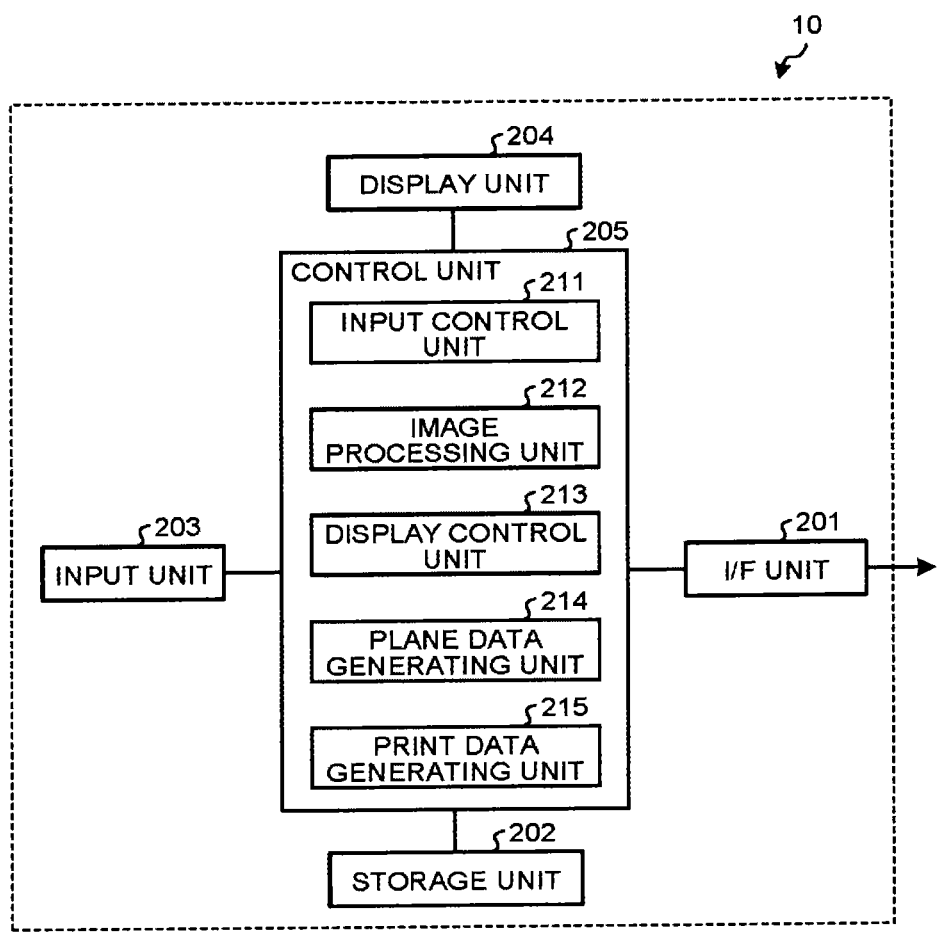
FIG. 12 is a block diagram of a configuration example of a host device according to the third embodiment.

Details of the host device 10 will be explained next. FIG. 12 is a block diagram illustrating a configuration example of the host device 10. The host device 10 includes an I/F unit 201, a storage unit 202, an input unit 203, a display unit 204, and a control unit 205.

The I/F unit 201 is an interface device for performing communication with the DFE 50. The storage unit 202 is a storage medium such as a hard disk drive (HDD) or a memory that stores various types of data. The input unit 203 is an input device used for the user to perform various operation inputs, and includes, for example, a keyboard and a mouse. The display unit 204 is a display device for displaying various screens, and includes, for example, a liquid crystal panel.

The control unit 205 is a computer including CPU, ROM, RAM, and the like. The control unit 205 controls the entire host device 10. The control unit 205 includes an input control unit 211, the image processing unit 212, a display control unit 213, the plane data generating unit 214, and the print data generating unit 215. The input control unit 211 and the display control unit 213 are implemented by the CPU reading and executing a program of an operating system stored in the ROM or the like. The image processing unit 212, the plane data generating unit 214, and the print data generating unit 215 are implemented by the CPU reading and executing programs of the image processing application stored in the ROM or the like. The plane data generating unit 214 is provided as a function of plug-in installed in, for example, the image processing application. At least part of these units may be implemented by a separate circuit (hardware).

The input control unit 211 receives input information according to an input that the input unit 203 receives from the user. For example, the user operates the input unit 203 to input image specifying information for specifying an image applying a surface effect among images (e.g., photos, texts, graphics, and images synthesized by these data) stored in the storage unit 202). The image specifying information may be set by some other method instead of receiving it from the user through the input unit 203.

The display control unit 213 provides control to display various pieces of information on the display unit 204. For example, when the input control unit 211 receives the image specifying information, the display control unit 213 reads the image specified by the image specifying information from the storage unit 202, and controls the display unit 204 so as to display the read image on the screen.

The user operates the input unit 203 while checking the image displayed on the display unit 204 to input surface effect specifying information for specifying an area to which a surface effect is applied and a type of the surface effect. The surface effect specifying information may be set by some other method instead of receiving it from the user through the input unit 203.

Figure 13:
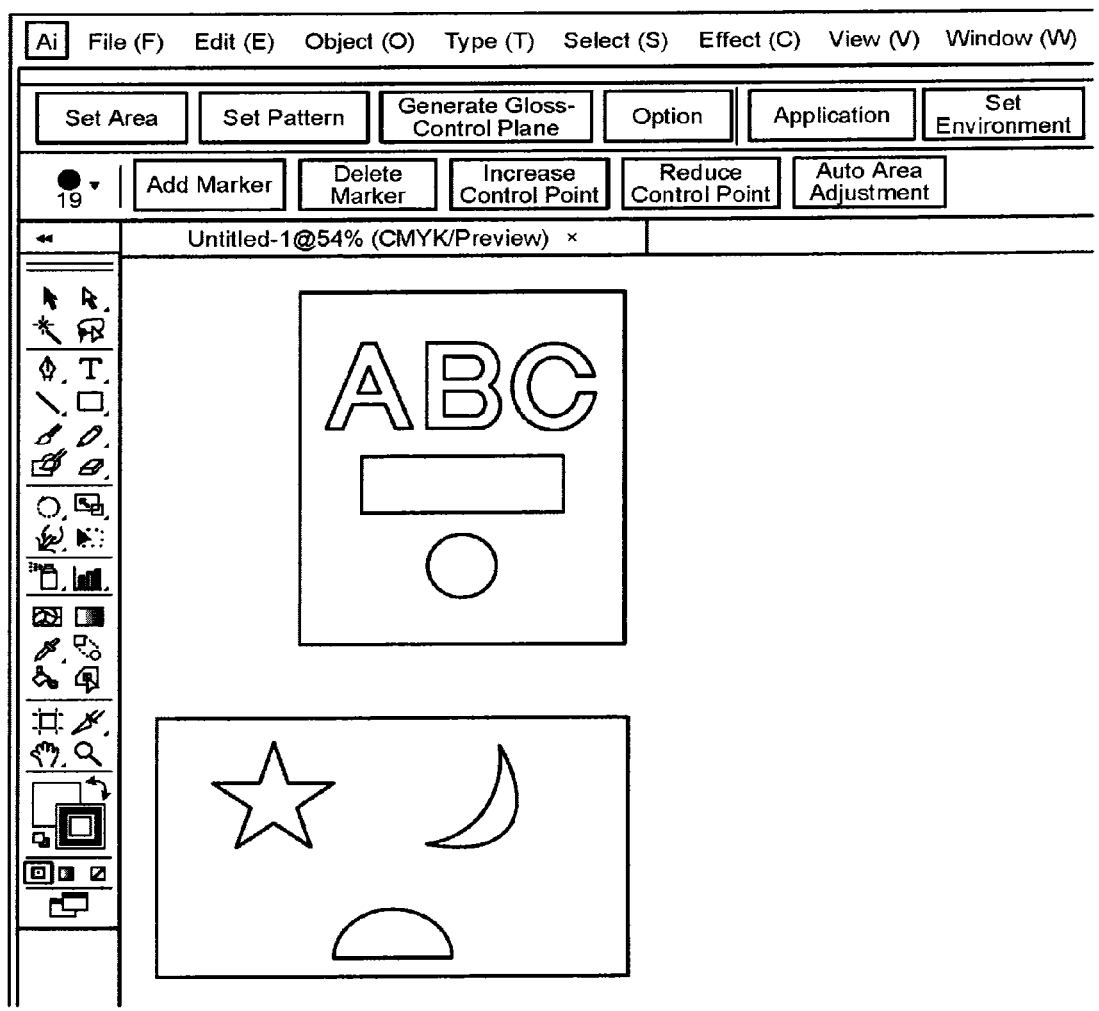
FIG. 13 is a diagram illustrating an example of an image displayed when the host device according to the third embodiment receives an operation input.
Figure 14:
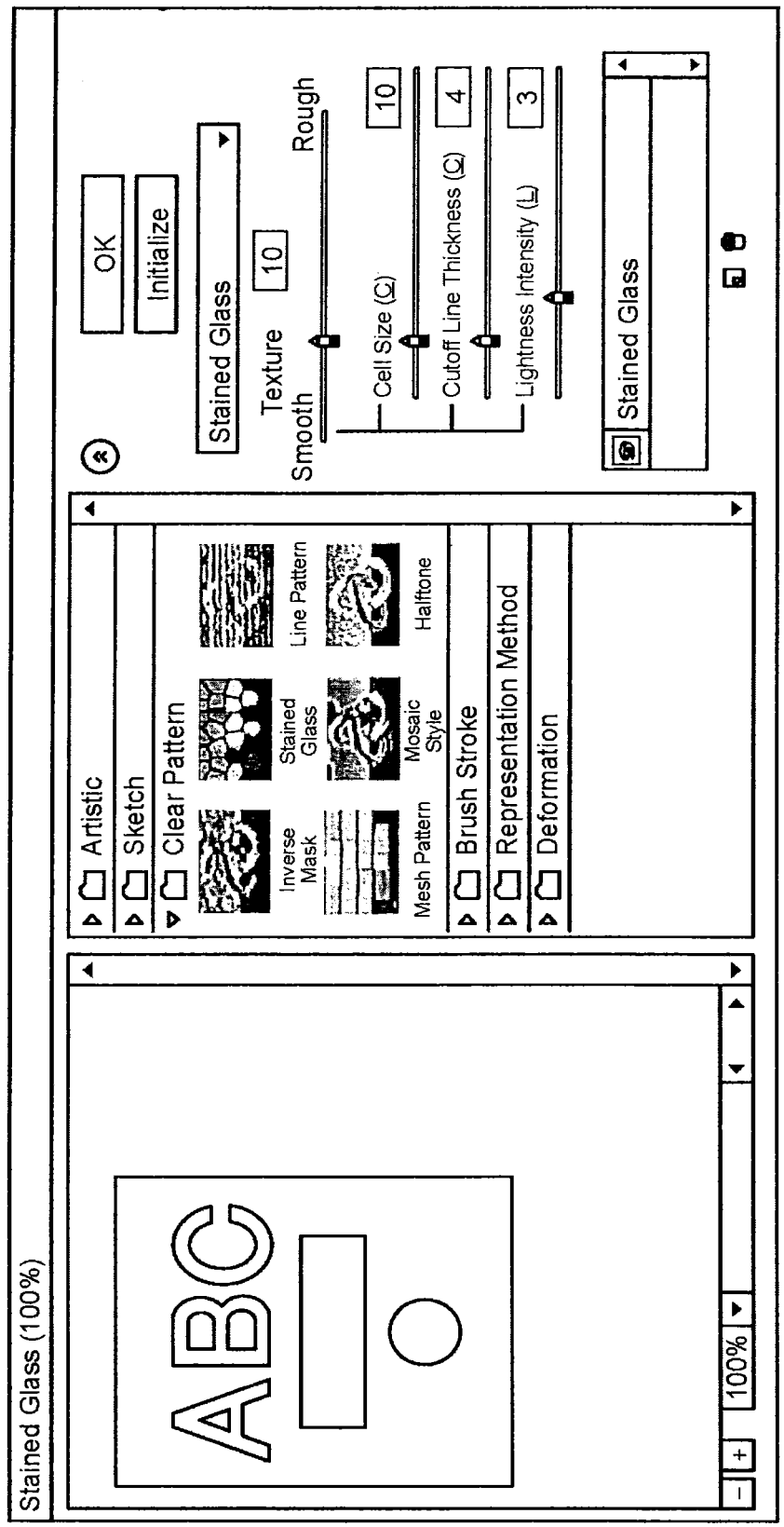
FIG. 14 is a diagram illustrating an example of an image displayed when the host device according to the third embodiment receives an operation input of surface effect specifying information.

A case in which an input of the surface effect specifying information is received from the user will be explained below with reference to FIG. 13 and FIG. 14. FIG. 13 is a diagram illustrating an example of the image that is displayed when the host device 10 according to the third embodiment receives an operation input. FIG. 14 is a diagram illustrating an example of the image that is displayed when the host device 10 according to the third embodiment receives an operation input of the surface effect specifying information.

FIG. 13 represents an example of an image that is displayed when plug-in is installed in Illustrator sold by Adobe Systems (R). In the example of FIG. 13, the image represented by the color plane image data is displayed, and the user presses a marker addition button via the input unit 203 to perform an operation input of specifying an area to which the surface effect is desired to be applied, thus specifying the area applied with the surface effect. The user performs such an operation input for all the areas to be applied with the surface effect. The display control unit 213 of the host device 10 displays the image exemplified in FIG. 14 on the display unit 204 for each specified area.

The example of FIG. 14 includes image information indicating an area that is specified as the area applied with the surface effect and display information for receiving an input of the surface effect specifying information. The input unit 203 receives an operation input of specifying a type of the surface effect for each area to be applied with the surface effect. The PG and the G in FIG. 9 are written as "Inverse Mask" in FIG. 14, and other effects excluding the PG and the G in FIG. 9 are written as Stained Glass, Line Pattern, Mesh Pattern, Mosaic Style, and Halftone in FIG. 14.

Referring back to FIG. 12, the image processing unit 212 performs image processing based on the user input received by the input unit 203.

The plane data generating unit 214 generates color plane image data, gloss-control plane image data, and clear plane image data. In other words, when the input control unit 211 receives information indicating color specification of a drawing object included in the image from the input unit 203, the plane data generating unit 214 generates the color plane image data based on the information indicating the color specification.

When the input control unit 211 receives information indicating a transparent image such as a watermark or texture other than the surface effect and indicating specification of an area to be applied with the transparent image from the input unit 203, the plane data generating unit 214 generates the clear plane image data that indicates the transparent image and the area of a transfer sheet to be applied with the transparent image, based on the information indicating the specification of the area.

When the input control unit 211 receives surface effect specifying information (information indicating an area to be applied with a surface effect and a type of the surface effect) from the input unit 203, the plane data generating unit 214 generates the gloss-control plane image data indicating the area of a transfer sheet to be applied with a surface effect and the type of the surface effect based on the surface effect specifying information. The plane data generating unit 214 generates gloss-control plane image data in which the area to be applied with the surface effect indicated by a gloss control value is specified by unit of a drawing object in image data of a target image.

Figures 15, 16:
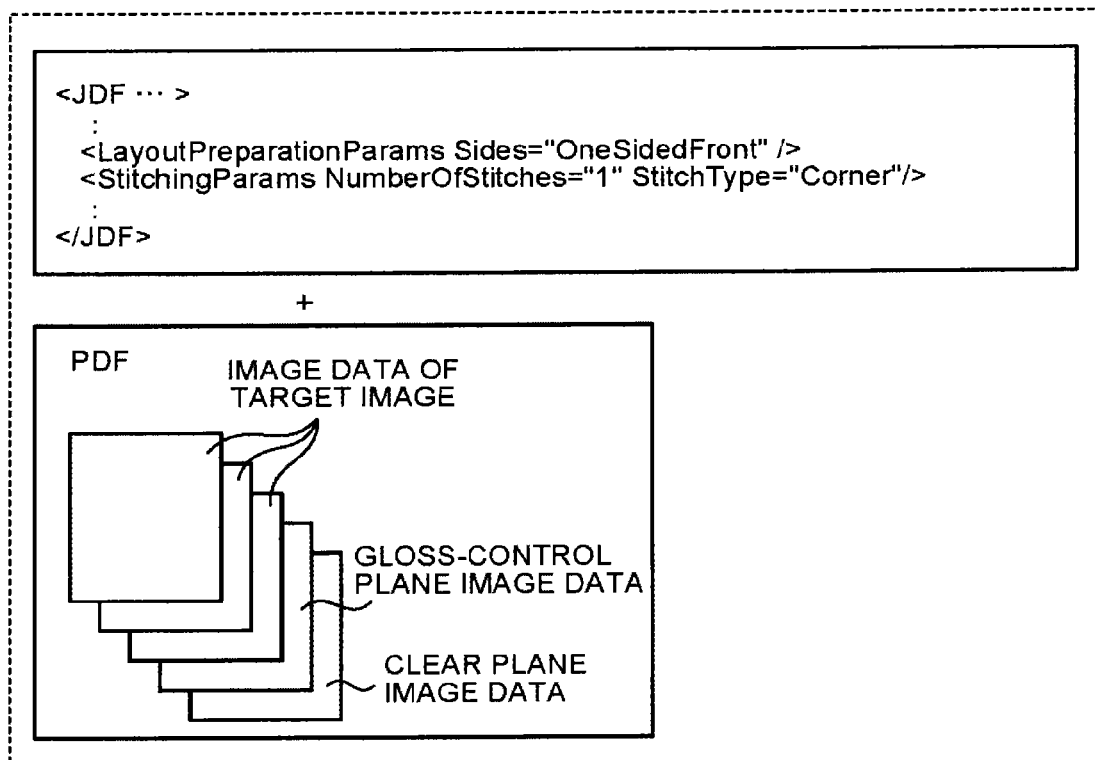
FIG. 15 is a diagram illustrating an example of a density value selection table according to the third embodiment.
FIG. 16 is a diagram conceptually illustrating a configuration example of print data according to the third embodiment.

The storage unit 202 stores the density value selection table including a type of the surface effect specified by the user and a density value of the gloss-control plane corresponding to the type of the surface effect. FIG. 15 is a diagram illustrating an example of the density value selection table according to the third embodiment. In the example of FIG. 15, the density value of the gloss-control plane corresponding to the area in which "PG" (Premium Gloss) is specified by the user is "98%", the density value of the gloss-control plane corresponding to the area in which the "G" (Gloss) is specified is "90%", and the density value of the gloss-control plane corresponding to the area in which the "M" (Matt) is specified is "16%".

The density value selection table is partial data of a surface effect selection table (in FIG. 21, explained later) stored in the DFE 50. The control unit 205 acquires the surface effect selection table at a predetermined timing, generates a density value selection table from the acquired surface effect selection table, and stores the density value selection table in the storage unit 202. The surface effect selection table may be stored in a storage server (cloud system) on a network such as the Internet, and the control unit 205 may acquire the surface effect selection table from the server to generate a density value selection table from the acquired surface effect selection table. However, the surface effect selection table stored in the DFE 50 needs to be the same data as the surface effect selection table acquired from the storage server (cloud system).

Referring back to FIG. 12, the plane data generating unit 214 refers to the density value selection table illustrated in FIG. 15, sets the density value (gloss control value) of a drawing object to which a predetermined surface effect is specified by the user to a value according to the type of the surface effect, and generates gloss-control plane image data.

For example, it is assumed that the user specifies that, of the color plane image data illustrated in FIG. 8, "PG" is applied to the area of "ABC", "G" is applied to the area of rectangle, and "M" is applied to the area of circle. In this case, the plane data generating unit 214 sets the density value of the "PG"-specified drawing object ("ABC") by the user to "98%", the density value of the "G"-specified drawing object ("rectangle") to "90%", and the density value of the "M"-specified drawing object ("circle") to "16%", and generates gloss-control plane image data.

The gloss-control plane image data generated by the plane data generating unit 214 is the data in vector format expressed as a set of coordinates of points, parameters of equations for lines and planes connecting the points, and drawing objects indicating filling and special effects or so. FIG. 10 is a diagram illustrating the gloss-control plane image data as an image. The plane data generating unit 214 generates document data in which the gloss-control plane image data, the color plane image data, and the clear plane image data are integrated, and transmits the document data to the print data generating unit 215.

The print data generating unit 215 generates print data based on the document data. The print data includes at least color plane image data and job commands, and further includes any one or both of the gloss-control plane image data and the clear plane image data. The job command includes, for example, information specifying setting of a printer, setting of aggregation, and setting of duplex printing for the printer.

FIG. 16 is a conceptual diagram, of a configuration example of print data according to the third embodiment. In the example of FIG. 16, a job definition format (JDF) is used as the job command. However, the job command is not limited to JDF and any job command may therefore be used. The JDF illustrated in FIG. 16 is a command for specifying "one-side printing, stapling" as the setting of aggregation. The print data may be converted into a page description language (PDL) like Postscript or may remain in the PDF if the DFE 50 can handle it.

Figure 17:
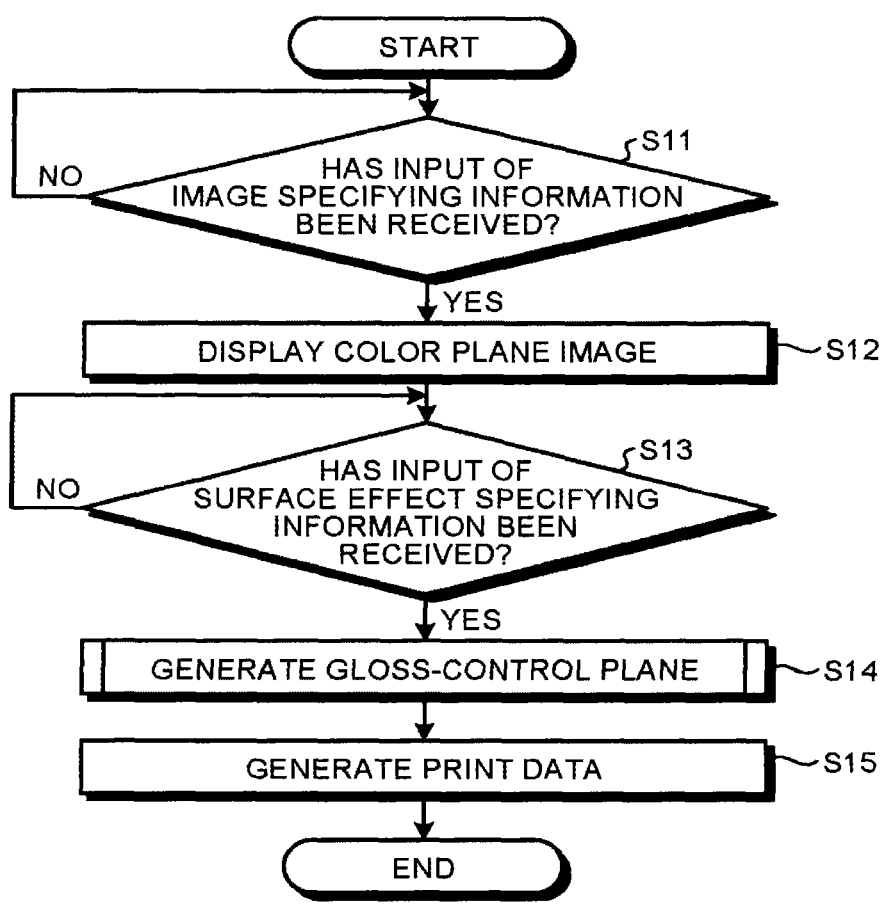
FIG. 17 is a flowchart illustrating how the host device according to the third embodiment generates print data.

Processing for generating print data by the host device 10 will be explained next. FIG. 17 is a flowchart illustrating how the host device 10 according to the third embodiment generates print data. The example of FIG. 17 represents a case in which a transparent image is not specified and clear plane image data is not therefore generated.

First, when the input control unit 211 receives an input of image specifying information from the input unit 203 (Yes at Step S11), the display control unit 213 controls the display unit 204 so as to display a color plane image specified by the received image specifying information (Step S12). When the input control unit 211 does not receive an input of the image specifying information from the input unit 203 (No at Step S11), the display control unit 213 waits until the input control unit 211 receives an input of the image specifying information.

Next, when the input control unit 211 receives an input of surface effect specifying information (Yes at Step S13), the plane data generating unit 214 generates gloss-control plane image data based on the received surface effect specifying information (Yes at Step S14). When the input control unit 211 does not receive an input of the surface effect specifying information (No at Step S13), the display control unit 213 waits until the input control unit 211 receives an input of the surface effect specifying information.

Figures 18, 19:
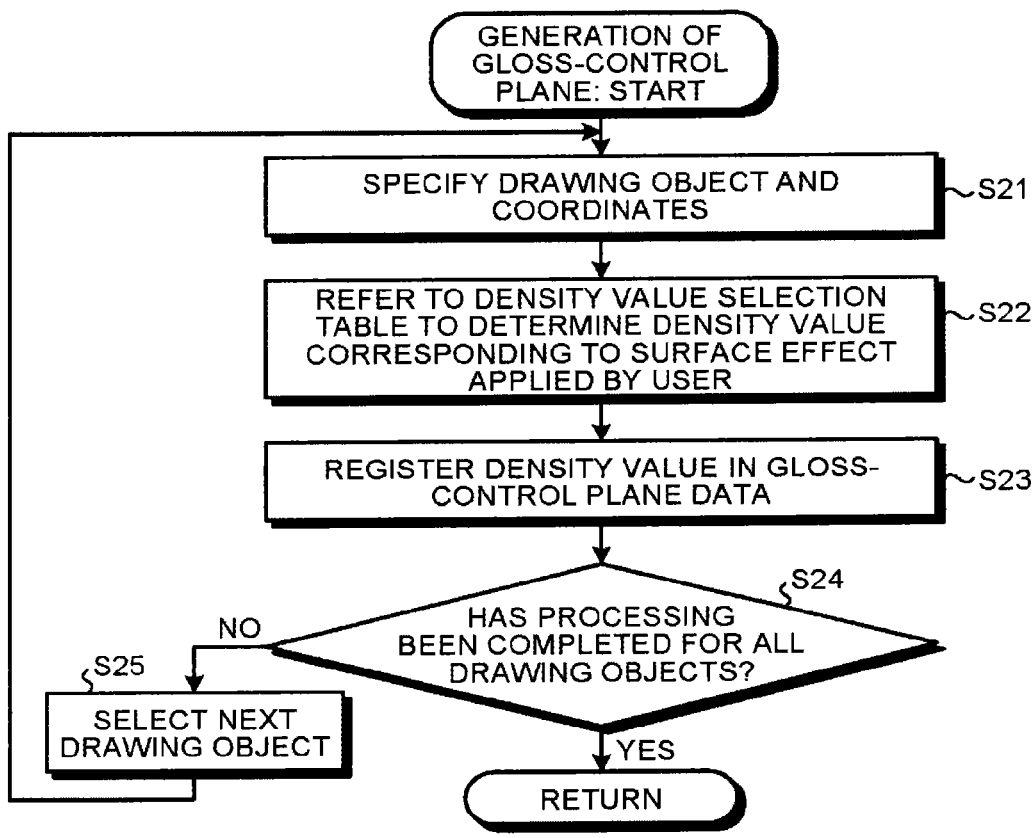
FIG. 18 is a flowchart illustrating how the host device according to the third embodiment generates gloss-control plane image data.
FIG. 19 is a diagram illustrating a correspondence relation among a drawing object, coordinates, and a density value of the gloss-control plane image data illustrated in FIG. 10.

Details of the processing for generating the gloss-control plane at Step S14 will be explained below. FIG. 18 is a flowchart illustrating how the host device 10 according to the third embodiment generates gloss-control plane image data. First, the plane data generating unit 214 specifies a drawing object in an image applied with the surface effect by the surface effect specifying information and the coordinates of the drawing object (Step S21). The drawing object and its coordinates are specified, for example, by using a drawing command used when the image processing unit 212 draws the drawing object and by using a coordinate value or the like set in the drawing command. The drawing command is provided by, for example, the operating system.

Subsequently, the plane data generating unit 214 refers to the density value selection table stored in the storage unit 202 to determine a density value (gloss control value) corresponding to the surface effect specified by the user in the surface effect specifying information (Step S22).

The plane data generating unit 214 then registers the drawing object and the density value determined corresponding to the surface effect in the gloss-control plane image data (initially, null data) in association with each other (Step S23).

The plane data generating unit 214 then determines whether or not the processing from Step S21 to Step S23 has been completed for all the drawing objects in the image (Step S24). When the processing has not been completed (No at Step S24), the plane data generating unit 214 selects a next drawing object not yet processed in the image (Step S25), and performs the processing from Step S21 to Step S23.

At Step S24, when it is determined that the processing from Step S21 to Step S23 has been completed for all the drawing objects in the image (Yes at Step S24), the plane data generating unit 214 completes the generation of the gloss-control plane image data. Thus, the gloss-control plane image data (see FIG. 10) according to the surface effect specifying information received by the image in FIG. 14 is generated. FIG. 19 is a diagram of a correspondence relation among a drawing object, coordinates, and a density value in the gloss-control plane image data illustrated in FIG. 10. For example, the coordinates indicating a location of the drawing object "A, B, C" are (x1, y1)-(x2, y2), and the density value of the area specified by the coordinates indicates 98%.

Referring back to FIG. 17, when the gloss-control plane image data is generated, the plane data generating unit 214 generates document data in which the gloss-control plane image data and the color plane image data are integrated and transmits the document data to the print data generating unit 215. The print data generating unit 215 then generates the print data based on the document data (Step S15).

Figure 20:
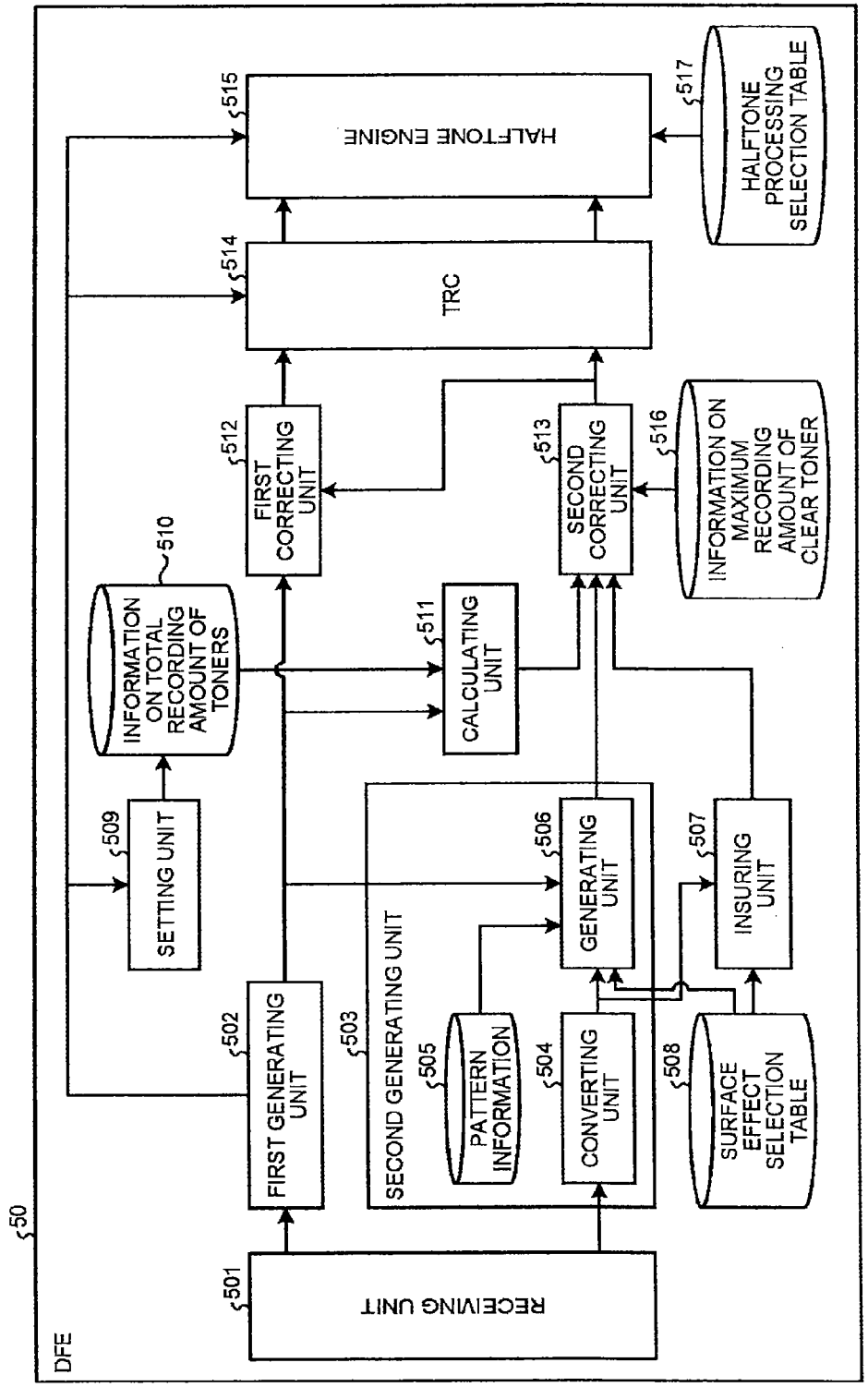
FIG. 20 is a diagram illustrating a configuration example of DFE according to the third embodiment.

Next, the configuration of the DFE 50 will be explained. FIG. 20 is a diagram illustrating a configuration example of DFE according to the third embodiment. The DFE 50 according to the present embodiment includes a receiving unit 501, a first generating unit 502, a second generating unit 503, an insuring unit 507, a setting unit 509, a calculating unit 511, a first correcting unit 512, a second correcting unit 513, a tone reproduction curve (TRC) 514, and a halftone engine 515. The DFE 50 stores pattern information 505, a surface effect selection table 508, information on the total recording amount of toners 510, information on the maximum recording amount of clear toner 516, and a halftone processing selection table 517 in a storage unit not illustrated in FIG. 20.

The receiving unit 501 receives the print data from the host device 10. The print data received by the DFE 50 according to the present embodiment will be explained assuming that the print data does not include the clear plane image data explained in the host device 10. That is, the print data received by the DFE 50 includes at least the color plane image data and further includes the gloss-control plane image data when the surface effect is applied to the image. The receiving unit 501 transmits the color plane image data to the first generating unit 502. When the gloss-control plane image data is included in the print data, the receiving unit 501 transmits the gloss-control plane image data to the second generating unit 503.

The first generating unit 502 interprets the language of the color plane image data to convert the image data expressed in the vector format into a raster format, and converts a color space expressed in RGB format or the like into a color space in CMYK format. The first generating unit 502 outputs the color toner image data expressing a density value of one pixel with 8 bits for respective colors of CMYK, and transmits the color toner image data to the first correcting unit 512, the second generating unit 503, and the calculating unit 511. The first generating unit 502 also outputs object information including information indicating a type of an object such as a text, a photo, and graphics in each image area extracted upon the language interpretation and also including the coordinates of the object, and transmits the object information to the setting unit 509, the TRC 514, and the halftone engine 515.

The second generating unit 503 includes a converting unit 504 and a generating unit 506. The converting unit 504 interprets the language of the gloss-control plane image data to convert the image data from the vector format into the raster format. The converting unit 504 transmits the image data in the raster format to the generating unit 506 and the insuring unit 507. The generating unit 506 receives the gloss-control plane image data in the raster format from the converting unit 504 and receives the color toner image data in the raster format from the first generating unit 502.

The generating unit 506 refers to the pattern information 505 and the surface effect selection table 508, and generates clear toner image data from the gloss-control plane image data. The clear toner image data is data representing a recording amount of a clear toner in each pixel of the image.

The pattern information 505 is image data for patterns such as a watermark character, a background pattern, and a texture pattern. The generating unit 506 refers to the pattern information 505 when the clear toner image data including the pattern is to be generated.

FIG. 21 is a diagram of an example of the surface effect selection table 508 according to the third embodiment. The surface effect selection table 508 includes fields of Density (%), Density Value (Representative Value, Value Range), Effect, Form, and Insured Amount.

Density (%) is information indicating gloss intensity of the surface effect. In the example of FIG. 21, Density (%) is measured by 2% units. Density Value (Representative Value, Value Range) is information representing the density (%) as a value ranging from 0 through 255. Value Range is a range of density values corresponding to the density in 2% units. Representative Value is a value representing the density value in the value range. Effect is information representing a type of a surface effect associated with each unit of density (%).

Form is information indicating in which form the clear toner is applied in order to achieve the effect. Insured Amount is a lower limit used to determine a recording amount assignable to a clear toner (which corresponds to Tmax explained in the first and the second embodiments) in order that the toner recording amount does not exceed the total recording amount of toners.

In the surface effect selection table 508, the surface effect is associated with each unit of density (%). Specifically, surface effects (Premium Gloss and Gloss) applying gloss are associated with a range ("212" to "255") of density values in which a density ratio is 84% or more. A surface effect (Matt) suppressing gloss is associated with a range ("1" to "43") of density values in which a density ratio is 16% or less. Surface effects such as texture, a background pattern, and a watermark are associated with a range of density values in which a density ratio ranges from 20% to 80%.

More specifically, the specular gloss (PM: Premium Gloss) as a surface effect is associated with pixel values of, for example, "238" to "255". Among the pixel values, different types of Premium Gloss are associated with three respective ranges of the pixel values of "238" to "242", the pixel values of "243" to "247", and the pixel values of "248" to "255". The solid gloss (G: Gloss) is associated with pixel values of "212" to "232". Among the pixel values, different types of Gloss are associated with four respective ranges of the pixel values of "212" to "216", the pixel values of "217" to "221", the pixel values of "222" to "227", and the pixel values of "228" to "232". The halftone matte (M: Matt) is associated with pixel values of "23" to "43". Among the pixel values, different types of Matt are associated with four respective ranges of the pixel values of "23" to "28", the pixel values of "29" to "33", the pixel values of "34" to "38", and the pixel values of "39" to "43". "No surface effect" is associated with a density value of "0".

Next, a Form field and an insured amount field in the surface effect selection table 508 will be specifically explained. In the example of FIG. 21, for example, when the density value is in a range from 248" to "255", the form of the clear toner image data generated by the generating unit 506 is Halftone 100% (solid) and the insured amount is 100%. This enables the clear toner to be recorded over the entire surface of a recording material and 100% of the recording amount of the clear toner to be insured, and therefore Premium Gloss Type A can be obtained by the clear toner.

When the density value is in a range from "228" to "232", the clear toner image data generated by the generating unit 506 is Inverse Mask 1 and the insured amount is 0%.

The inverse mask will be explained below. The inverse mask is image data, for an area applied with a surface effect, that the generating unit 506 creates by adding all the density values of the pixels in the color plane image data for respective colors of CMYK that form the area and by subtracting the addition value from a predetermined value. The inverse mask is used so that a combined toner recording amount between the clear toner and respective toners of CMYK for the pixels that form the area applied with the surface effect is made uniform in the area applied with the surface effect.

An example of a method for creating the inverse mask will be explained. First of all, a first example of the inverse mask will be explained below.

$$Clr=100-(C+M+Y+K), \text{ if } Clr<0, Clr=0 \qquad (4)$$

In Equation (4), Clr, C, M, Y, and K represent density ratios (%) of a clear toner and respective color toners of C, M, Y, and K converted from the density values (0 to 255) in each pixel. When the total of the toner recording amounts of C, M, Y, and K is 100% or less by creating the inverse mask using Equation (4), the combined toner recording amount between the color toner recording amount and the clear toner recording amount in the area applied with the surface effect can be made 100%.

When the total of the color toner recording amounts of C, M, Y, and K is 100% or more, then Clr=0, and therefore the density ratio is 0%. However, when the total of the color toner recording amounts of C, M, Y, and K is 100% or more, the gloss can be created even if the density ratio is 0%. This is because a portion where the color toner recording amounts of C, M, Y, and K exceed 100% is smoothed by fixing processing. As a result, surface unevenness caused by a difference between the toner recording amounts in the area is eliminated, and regular reflection of light thereby creates gloss.

Any value other than 100% may be set in a first term on right side in Equation (4).

Next, a second example of the inverse mask will be explained.

$$Clr=100 \qquad (5)$$

In Equation (5), Clr represents a density ratio (%) of a clear toner converted from a density value (0 to 255) in each pixel. By creating the inverse mask using Equation (5), the clear toner can be uniformly attached to each pixel. The inverse mask used to uniformly attach the clear toner to each pixel is referred to as a solid mask. Any value other than 100% may be set in Equation (5).

A third example of the inverse mask will be explained below.

$$Clr=100 \times \{(100-C)/100\} \times \{(100-M)/100\} \times \{(100-Y)/100\} \times \{(100-K)/100\} \qquad (6)$$

In Equation (6), Clr, C, M, Y, and K represent density ratios (%) of a clear toner and respective color toners of C, M, Y, and K converted from a density value (0 to 255) in each pixel. Herein, (100−C)/100 represents a background exposure ratio of C, (100−M)/100 represents a background exposure ratio of M, (100−Y)/100 represents a background exposure ratio of Y, and (100−K)/100 represents a background exposure ratio of K.

Referring back to FIG. 21, the inverse mask 1 used when the density value is in the range from "228" to "232" is created by, for example, the generating unit 506 using Equation (4). The inverse mask is used to attach the clear toner more to any area with less color toners of CMYK. This is because a certain amount of gloss is obtained due to influence of CMYK toners in an area with a more amount of CMYK toners but a low degree of gloss is obtained in an area with a less amount of CMYK toners. When the inverse mask is used, the clear toner is not originally attached to the area with the more amount of CMYK toners. Therefore, in the example of the surface effect selection table 508 in FIG. 21, each insured amount of the inverse masks 1 to 4 is set to 0%.

When the surface effect is Matt, the clear toner image data generated by the generating unit 506 represents Halftone (halftone dots) with a low area ratio, and the insured amount is therefore 0%.

The generating unit 506 refers to the surface effect selection table in FIG. 21, and generates an inverse mask, a pattern image, or a solid mask as required from the color toner image data in which the color toner image data for respective colors of CMYK are combined, based on the density value representing each pixel. The generating unit 506 thereby generates the clear toner image data in order to attach the clear toner.

The insuring unit 507 receives the gloss-control plane image data in the raster format from the converting unit 504. The insuring unit 507 uses the density value represented by 8 bits in each pixel of the image data to search for the density value from the surface effect selection table 508, and acquires the insured amount of the searched record. In other words, the insuring unit 507 specifies a surface effect from the density value for each pixel (area) in the image data, and acquires the insured amount corresponding to the specified surface effect. The insuring unit 507 transmits the insured amount for each type of surface effects to be applied to an image area to the second correcting unit 513.

The setting unit 509 receives the object information from the first generating unit 502, and sets the information on the total recording amount of toners previously stored according to the type of the object in each pixel (area) corresponding to the coordinates of the object. The information on the total recording amount of toners is information indicating a toner recording amount as a limit with which the printer machine 70 can record on a recording material. The information on the total recording amount of toners set by the setting unit 509 is not limited to the information on the total recording amount of toners previously stored according to the type of the object. For example, the information on the total recording amount of toners acquired from a user operation input may be set.

FIG. 22 is a diagram illustrating an example of a total recording amount of toners defined for each object. In the example of FIG. 22, when the object is photo, then the total recording amount of toners is 260%, when the object is text, then the total recording amount of toners is 200%, and when the object is graphics, then the total recording amount of toners is 240%.

The calculating unit 511 calculates a recording amount assignable to a clear toner in each pixel (Tmax explained in the first and the second embodiments) based on the color toner image data received from the first generating unit 502 and the information on the total recording amount of toners set by the setting unit 509. Specifically, the calculating unit 511 calculates a recording amount assignable to the clear toner in each pixel using, for example, the Equation (2).

The second correcting unit 513 receives the clear toner image data from the generating unit 506, receives the insured amount for each type of surface effects to be applied to the image area from the insuring unit 507, and receives the recording amount assignable to the clear toner from the calculating unit 511. The second correcting unit 513 acquires the information on the maximum recording amount of clear toner from a storage unit not illustrated in FIG. 20. The information on the maximum recording amount of clear toner is information corresponding to the maximum recording amount of the transparent color material as explained in the first embodiment. The maximum recording amount of the clear toner is, for example, 100%.

For the recording amount assignable to a clear toner in each pixel, the second correcting unit 513 compares the recording amount assignable to the clear toner in the pixel with the insured amount corresponding to the area including the pixel. When the recording amount assignable to the clear toner is the insured amount or more, the second correcting unit 513 uses the value of the recording amount assignable to the clear toner as it is. When the recording amount assignable to the clear toner is smaller than the insured amount, the second correcting unit 513 corrects the recording amount assignable to the clear toner to the value of the insured amount.

The second correcting unit 513 corrects the recording amount of the clear toner for each pixel based on the recording amount assignable to the clear toner which is corrected according to the insured amount and the maximum recording amount of clear toner. The second correcting unit 513 corrects the recording amount of the clear toner in each pixel by using, for example, Equation (1). The second correcting unit 513 transmits the corrected clear toner image data to the first correcting unit 512 and the TRC 514.

The first correcting unit 512 receives the color toner image data for respective colors of CMYK from the first generating unit 502, and receives the corrected clear toner image data from the second correcting unit 513. The first correcting unit 512 reads the information on the total recording amount of toners set by the setting unit 509 from the storage unit not illustrated in FIG. 20.

For each pixel, when the combined toner recording amount between the corrected clear toner recording amount and the color toner recording amount of respective colors of CMYK is greater than the total recording amount of toners, the first correcting unit 512 performs correction so as to reduce the color toner recording amount. The first correcting unit 512 corrects the color toner recording amount by using, for example, Equation (3). The first correcting unit 512 transmits the corrected color toner image data for respective colors of CMYK to the TRC 514.

The TRC 514 receives the object information from the first generating unit 502, receives the color toner image data for respective colors of CMYK from the first correcting unit 512, and receives the clear toner image data from the second correcting unit 513. The TRC 514 performs gamma correction on the color toner image data and the clear toner image data using a gamma curve of a one-dimensional lookup table (1D-LUT) generated by calibration according to the type of the object indicated by the object information. The TRC 514 transmits the color toner image data for respective colors of CMYK after the gamma correction and the clear toner image data after the gamma correction to the halftone engine 515.

The halftone engine 515 receives the color toner image data for respective colors of CMYK after the gamma correction and the clear toner image data after the gamma correction from the TRC 514, and receives the object information from the first generating unit 502. The halftone engine 515 reads the halftone processing selection table from the storage unit not illustrated in the figure.

FIG. 23 is a diagram illustrating an example of the halftone processing selection table according to the third embodiment. The halftone processing selection table is a table that defines parameters (Line frequency, Shape, and Angle) used to perform halftone processing for each type of an object and a toner. For example, when the type of an object is photo and the type of toner is cyan (C), the halftone engine 515 performs the halftone processing with the line frequency set as 190, the shape set as a halftone pattern, and with the angle set as 72 degrees. The halftone processing is processing of converting each pixel value of pixels forming the area of the object into a data format expressed with 2 bits according to the type of the object included in the image. However, the 2 bits are only an example, and therefore any other number of bits may be used.

The halftone engine 515 uses the type of an object indicated by the object information and the type of toner of the toner image data to determine parameters (Line frequency, Shape, and Angle) to be used for the halftone processing from the halftone processing selection table. More specifically, first of all, the halftone engine 515 acquires attribute information for each pixel indicating the type of the object from the object information. Then, the halftone engine 515 acquires the type of toner in a pixel of the toner image data corresponding to the attribute information for the pixel. The halftone engine 515 then uses the attribute information for each pixel indicating the type of an object and the type of toner in the pixel to determine the parameters (Line frequency, Shape, and Angle) used for the halftone processing from the halftone processing selection table. The halftone engine 515 uses the parameters to perform the halftone processing on the toner image data. The halftone engine 515 transmits the toner image data (the color toner image data for respective colors of CMYK and the clear toner image data) after the halftone processing to the MIC 60.

Figure 24:
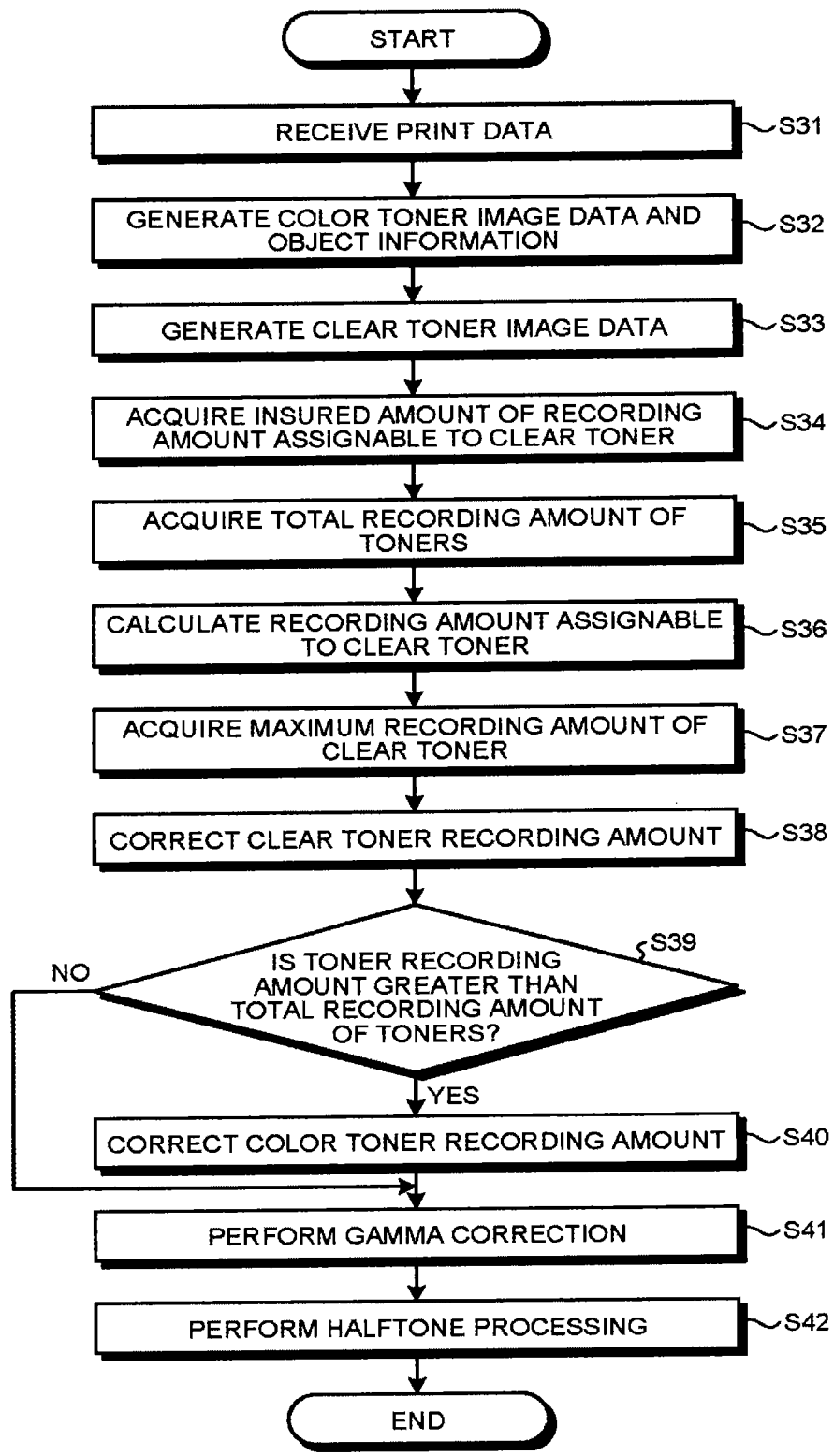
FIG. 24 is a flowchart illustrating an example of an image processing method according to the third embodiment.

FIG. 24 is a flowchart of an example of an image processing method according to the third embodiment. The receiving unit 501 receives the print data from the host device 10 (Step S31). The receiving unit 501 transmits the color plane image data for respective colors of CMYK included in the print data to the first generating unit 502. The receiving unit 501 transmits the gloss-control plane image data included in the print data to the second generating unit 503 (converting unit 504).

The first generating unit 502 interprets the language of the color plane image data to generate the color toner image data and generates the object information obtained when the language is interpreted (Step S32). The first generating unit 502 transmits the color toner image data to the first correcting unit 512, the generating unit 506 of the second generating unit 503, and to the calculating unit 511, and transmits the object information to the setting unit 509, the TRC 514, and to the halftone engine 515.

The second generating unit 503 generates the clear toner image data from the gloss-control plane image data (Step S33).

Figure 25:
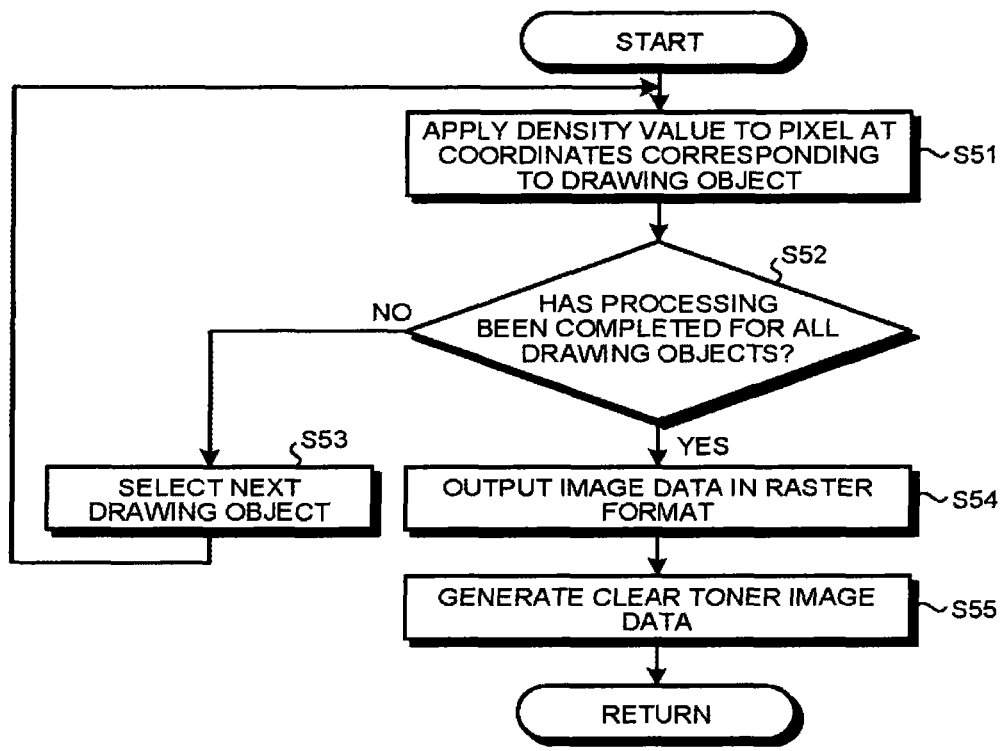
FIG. 25 is a flowchart illustrating an example of a method of generating clear toner image data according to the third embodiment.

Details of the processing at Step S33 will be explained below. FIG. 25 is a flowchart illustrating an example of a method of generating clear toner image data according to the third embodiment. The second generating unit 503 (converting unit 504) converts the data format (see FIG. 19) in which a density value is associated with a drawing object into a data format represented with the density value of a pixel corresponding to the coordinates of the drawing object (Step S51). That is, the second generating unit 503 (converting unit 504) converts the data format of the gloss-control plane image data into a raster format.

The second generating unit 503 (converting unit 504) determines whether the processing at Step S51 is performed on all the drawing objects (Step S52). When the processing at Step S51 is not performed on all the drawing objects (No at Step S52), then the second generating unit 503 selects a next drawing object (Step S53), and returns to Step S51. When the processing at Step S51 is performed on all the drawing objects (Yes at Step S52), then the second generating unit 503 outputs the gloss-control plane image data in the raster format being the data format in which the density value is associated with each pixel (Step S54). The converting unit 504 transmits the image data in the raster format to the generating unit 506. The generating unit 506 receives the image data in the raster format and also receives the color toner image data for respective colors of CMYK from the first generating unit 502. The generating unit 506 refers to the surface effect selection table 508 and the pattern information 505 to generate clear toner image data from the image data in the raster format and the color toner image data for respective colors of CMYK (Step S55).

Referring back to FIG. 24, the insuring unit 507 receives the gloss-control plane image data in the raster format from the second generating unit 503 (converting unit 504). The insuring unit 507 uses the density value represented with 8 bits in each pixel of the image data to search for the density value from the surface effect selection table 508, and acquires the insured amount of the searched record (Step S34). The insuring unit 507 transmits the insured amount for each type of surface effects to be applied to the image area to the second correcting unit 513.

The setting unit 509 receives the object information from the first generating unit 502, and sets the information on the total recording amount of toners previously stored according to the type of the object in each pixel (area) corresponding to the coordinates of the object. The calculating unit 511 acquires the information on the total recording amount of toners set by the setting unit 509 from the storage unit not illustrated in FIG. 20 (Step S35). The calculating unit 511 receives the color toner image data in the raster format from the first generating unit 502. The calculating unit 511 calculates a recording amount assignable to the clear toner in each pixel based on the color toner image data in the raster format and the information on the total recording amount of toners (Step S36). That is, the calculating unit 511 calculates a recording amount assignable to the clear toner by subtracting the recording amount of a color toner represented by the color toner image data in the raster format from the total recording amount of toners indicated by the information on the total recording amount of toners. The calculating unit 511 transmits the recording amount assignable to the clear toner to the second correcting unit 513.

The second correcting unit 513 receives the clear toner image data from the generating unit 506, receives the insured amount for each type of surface effects to be applied to the image area from the insuring unit 507, and receives the recording amount assignable to the clear toner from the calculating unit 511. The second correcting unit 513 acquires the information on the maximum recording amount of clear toner from the storage unit not illustrated in FIG. 20 (Step S37). The second correcting unit 513 corrects the recording amount of the clear toner in each pixel based on the recording amount assignable to the clear toner and the maximum recording amount of the clear toner corrected according to the insured amount (Step S38). The second correcting unit 513 transmits the corrected clear toner image data to the first correcting unit 512 and the TRC 514.

The first correcting unit 512 receives the color toner image data for respective colors of CMYK from the first generating unit 502, and receives the corrected clear toner image data from the second correcting unit 513. The first correcting unit 512 reads the information on the total recording amount of toners set by the setting unit 509 from the storage unit not illustrated in the figure.

The first correcting unit 512 determines whether or not the combined toner recording amount between the corrected clear toner recording amount and the color toner recording amount of respective colors of CMYK is greater than the total recording amount of toners (Step S39). When the toner recording amount is greater than the total recording amount of toners (Yes at Step S39), the first correcting unit 512 corrects the color toner recording amount using, for example, Equation (3) (Step S40). The first correcting unit 512 transmits the corrected color toner image data for respective colors of CMYK to the TRC 514. When the toner recording amount is the total recording amount of toners or less (No at Step S39), the process proceeds to Step S41.

The TRC 514 receives the object information from the first generating unit 502, receives the color toner image data for respective colors of CMYK from the first correcting unit 512, and receives the clear toner image data from the second correcting unit 513. The TRC 514 performs the gamma correction by the gamma curve of the 1D-LUT generated by calibration on the color toner image data and the clear toner image data according to the type of an object indicated by the object information (Step S41). The TRC 514 transmits the color toner image data for respective colors of CMYK after the gamma correction and the clear toner image data after the gamma correction to the halftone engine 515.

The halftone engine 515 receives the color toner image data for respective colors of CMYK after the gamma correction and the clear toner image data after the gamma correction from the TRC 514, and receives the object information from the first generating unit 502. The halftone engine 515 uses the type of the object indicated by the object information and the type of the toner of the toner image data to determine parameters (Line frequency, Shape, and Angle) to be used for the halftone processing from the halftone processing selection table. The halftone engine 515 uses the parameters to perform the halftone processing on the toner image data (Step S42).

The image processing system 100 according to the present embodiment is configured that the insuring unit 507 insures the lower limit of the recording amount assignable to the clear toner according to the type of the surface effect. This enables the clear toner to maintain the surface effect applied to the image as long as possible and the clear toner recording amount to be adjusted without losing a sense of unity and a gradation property as an entire image.

Fourth Embodiment

An image processing system 100 according to a fourth embodiment will be explained below. In the image processing system 100 according to the present embodiment, part of processing in the image processing system 100 according to the third embodiment is implemented by using a cloud system.

Figure 26:
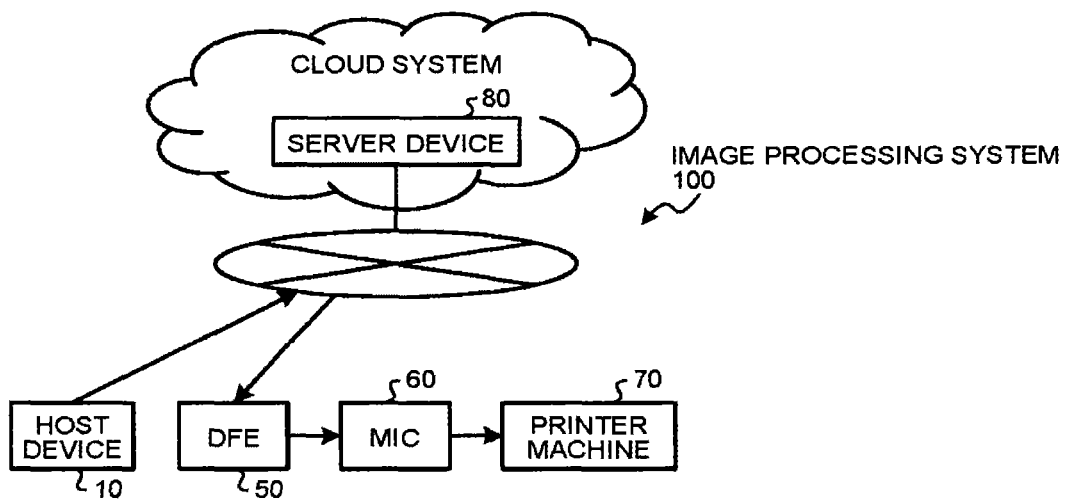
FIG. 26 is a diagram illustrating a configuration example of an image processing system according to a fourth embodiment of the present invention.

FIG. 26 is a diagram of a configuration example of the image processing system 100 according to the fourth embodiment. The image processing system 100 according to the present embodiment includes the host device 10, the DFE 50, the MIC 60, the printer machine 70, and a server device 80 on the cloud system. The server device 80 on the cloud system includes part of the functional block of the DFE 50 according to the third embodiment. The host device 10, the MIC 60, and the printer machine 70 are the same as these of the image processing system 100 according to the third embodiment, and therefore the explanation thereof is omitted herein.

Figure 27:
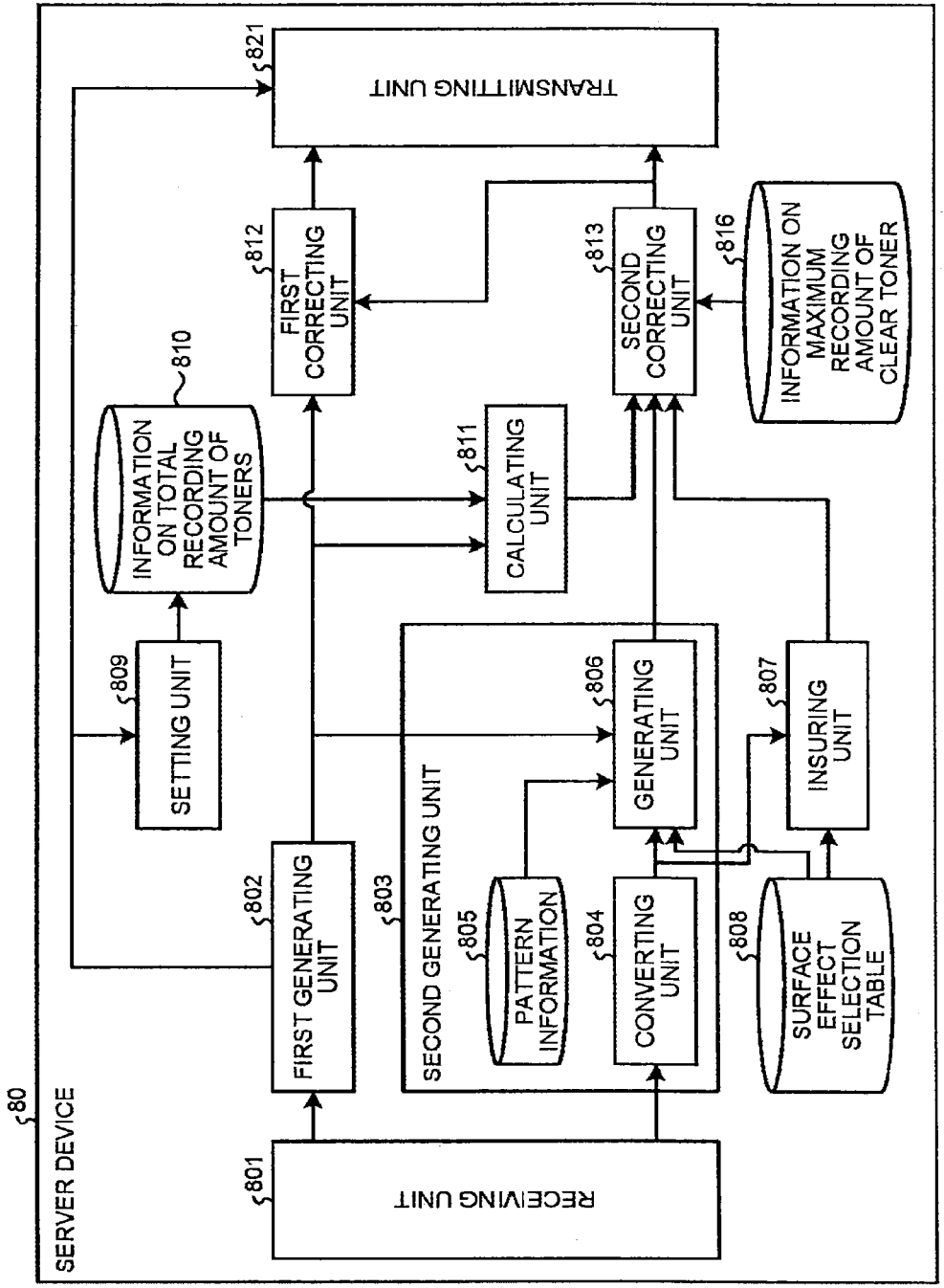
FIG. 27 is a diagram illustrating a configuration example of a server device according to the fourth embodiment.

FIG. 27 is a diagram illustrating a configuration example of the server device 80 according to the fourth embodiment. The server device 80 includes a receiving unit 801, a first generating unit 802, a second generating unit 803, an insuring unit 807, a setting unit 809, a calculating unit 811, a first correcting unit 812, a second correcting unit 813, and a transmitting unit 821. The server device 80 stores pattern information 805, a surface effect selection table 808, information on the total recording amount of toners 810, and information on the maximum recording amount of clear toner 816 in a storage unit not illustrated in FIG. 27.

The server device 80 according to the present embodiment performs any processing, of the processing in the DFE 50 according to the third embodiment, other than the gamma correction performed by the TRC 514 and the halftone processing performed by the halftone engine 515. The receiving unit 801, the first generating unit 802, the second generating unit 803, the insuring unit 807, the setting unit 809, the calculating unit 811, the first correcting unit 812, and the second correcting unit 813 are the same as the receiving unit 501, the first generating unit 502, the second generating unit 503, the insuring unit 507, the setting unit 509, the calculating unit 511, the first correcting unit 512, and the second correcting unit 513 in the DFE 50 according to the third embodiment. Therefore, the explanation thereof is omitted herein. Moreover, the pattern information 805, the surface effect selection table 808, information on the total recording amount of toners 810, and information on the maximum recording amount of clear toner 816 are the same as the pattern information 505, the surface effect selection table 508, the information on the total recording amount of toners 510, and the information on the maximum recording amount of clear toner 516 in the DFE 50 according to the third embodiment. Therefore, the explanation thereof is omitted herein.

The transmitting unit 821 receives the object information from the first generating unit 802, receives the corrected color toner image data for respective colors of CMYK from the first correcting unit 812, and receives the corrected clear toner image data from the second correcting unit 813. The transmitting unit 821 transmits the object information, the corrected color toner image data for respective colors of CMYK, and the corrected clear toner image data to the DFE 50.

Figure 28:
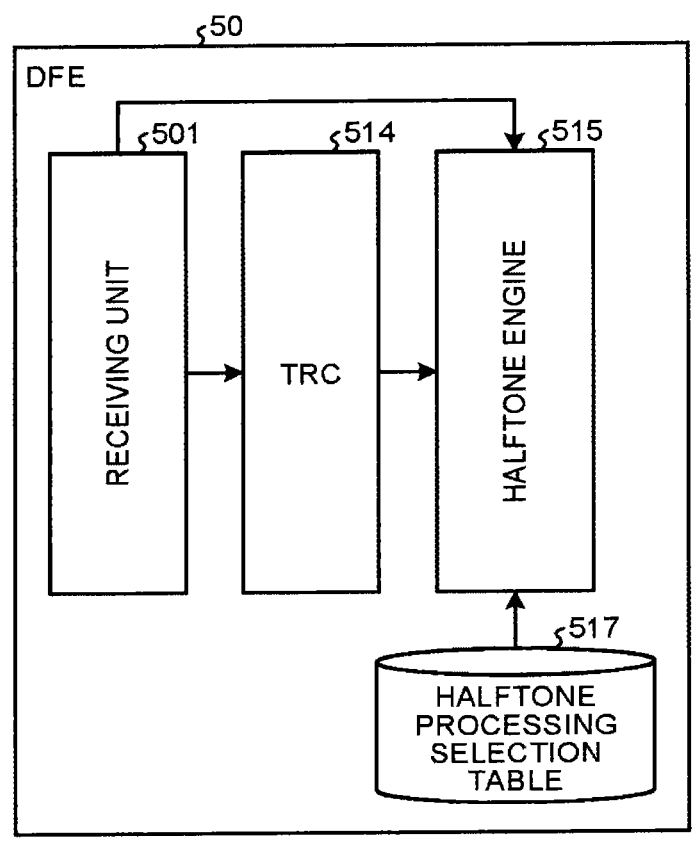
FIG. 28 is a diagram illustrating a configuration example of DFE according to the fourth embodiment.

FIG. 28 is a diagram of a configuration example of the DFE 50 according to the fourth embodiment. The DFE 50 according to the present embodiment includes the receiving unit 501, the TRC 514, and the halftone engine 515. The DEE 50 stores the halftone processing selection table 517 in a storage unit not illustrated in FIG. 28.

The receiving unit 501 receives the object information, the corrected color toner image data for respective colors of CMYK, and the corrected clear toner image data from the server device 80. The receiving unit 501 transmits the corrected color toner image data for respective colors of CMYK and the corrected clear toner image data to the TRC 514. The receiving unit 501 also transmits the object information to the TRC 514 and the halftone engine 515. The TRC 514, the halftone engine 515, and the halftone processing selection table 517 are the same as these in the DEE 50 according to the third embodiment. Therefore, the explanation thereof is omitted herein.

Figure 29:
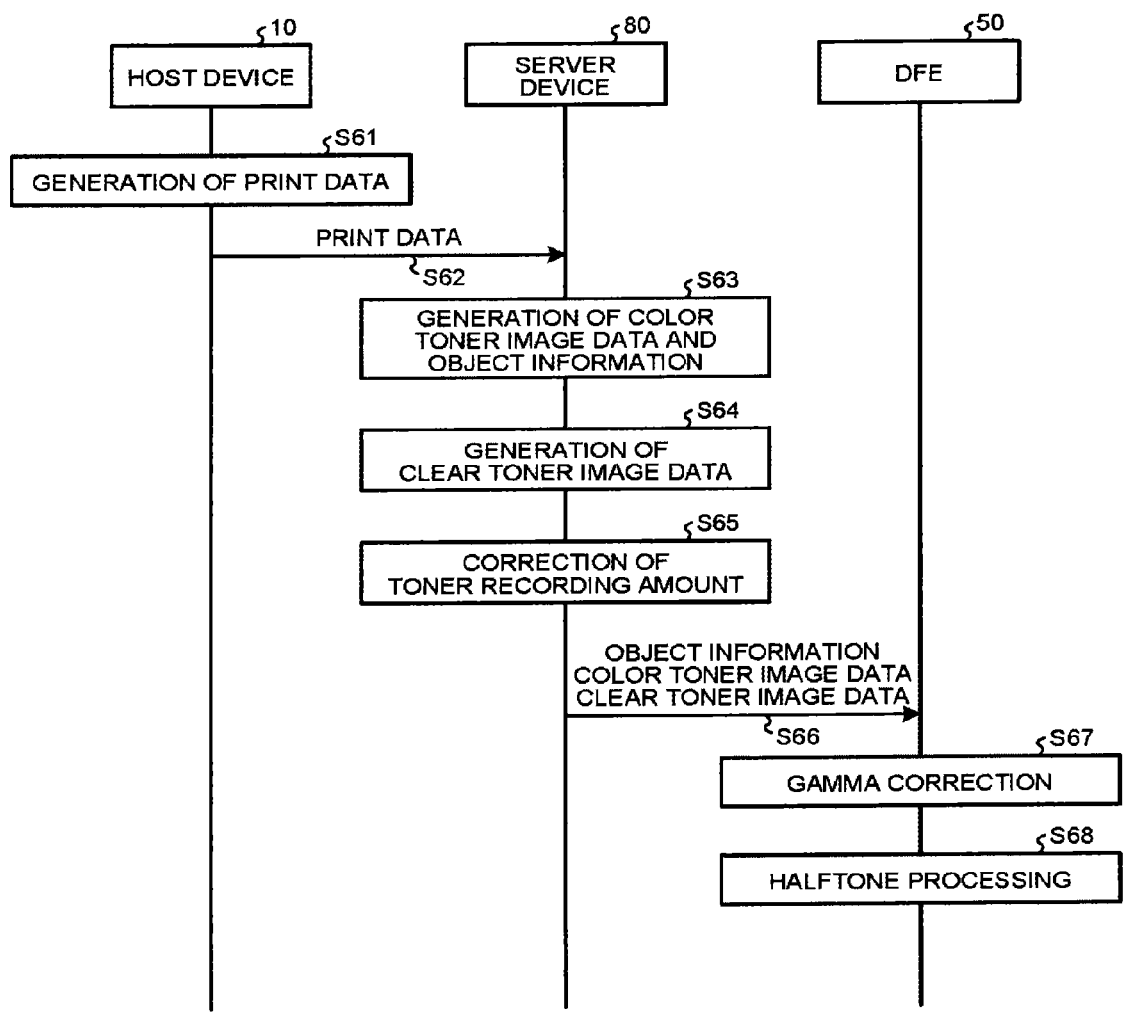
FIG. 29 is a sequence diagram illustrating an example of an image processing method according to the fourth embodiment.

FIG. 29 is a sequence diagram of an example of an image processing method according to the fourth embodiment. The host device 10 generates the print data (Step S61). The details of the processing for generating the print data are the same as these in the explanation according to the third embodiment, and therefore the explanation thereof is omitted herein. The host device 10 transmits the print data to the server device 80 (Step S62).

The server device 80 receives the print data from the host device 10. Subsequently, the server device 80 performs the processing for generating color toner image data and object information (Step S63). The processing for generating the color toner image data and the object information is the processing performed by the first generating unit 802. The details of the processing are the same as these in the explanation according to the third embodiment, and therefore the explanation thereof is omitted herein. The server device 80 performs the processing for generating clear toner image data (Step S64). The generation of the clear toner image data is the processing performed by the second generating unit 803. The details of the processing are the same as these in the explanation according to the third embodiment, and therefore the explanation thereof is omitted herein. The server device 80 then performs the processing for correcting a toner recording amount (Step S65). The correction of the toner recording amount is the processing performed by the insuring unit 807, the setting unit 809, the calculating unit 811, the first correcting unit 812, and the second correcting unit 813. The details of the processing are the same as these in the explanation according to the third embodiment, and therefore the explanation thereof is omitted herein. The transmitting unit 821 of the server device 80 transmits the object information, the corrected color toner image data for respective colors of CMYK, and the corrected clear toner image data to the DFE 50 (Step S66).

The DFE 50 receives the object information, the corrected color toner image data for respective colors of CMYK, and the corrected clear toner image data from the server device 80. The TRC 514 of the DFE 50 performs gamma correction (Step S67). The details of the processing are the same as these in the explanation according to the third embodiment, and therefore the explanation thereof is omitted herein. The halftone engine 515 of the DFE 50 performs the halftone processing (Step S68). The details of the processing are the same as these in the explanation according to the third embodiment, and therefore the explanation thereof is omitted herein.

According to the image processing system 100 of the present embodiment, the server device 80 on the cloud system performs, for example, the correction of the toner recording amount, and this enables the server device 80 to be commonly used by a plurality of image processing systems 100. As a result, it is possible to expect such effects as reduction in operational costs by centralizing the management of the surface effect selection table and the like and as reduction in hardware costs, and the like.

A combination of processings performed by the server device 80 on the cloud system is not limited to the combination according to the present embodiment, and may therefore be any combination of parts of the processings in DFE 50. For example, of the functional block in the DFE 50 according to the third embodiment, the DFE 50 may be configured to include the first generating unit 502 and the second generating unit 503, and the server device 80 on the cloud system may be configured to include the functional block except for the first generating unit 502 and the second generating unit 503. That is, the DFE 50 receives the print data from the host device 10, generates color toner image data and clear toner image data from the received print data, and transmits the generated data to the server device 80. The server device 80 receives the color toner image data and the clear toner image data from the DFE 50, and corrects the received color toner image data and clear toner image data as necessary (the processing of the first correcting unit 812 and the second correcting unit 813). The server device 80 transmits the corrected color toner image data and the corrected clear toner image data to the DFE 50. As a result, the image processing system 100 can be configured by the DFE 50 that generates color toner image data and clear toner image data and by the server device 80 that corrects the color toner image data and the clear toner image data.

In addition, all the processings in the DFE 50 may be performed by the server device 80 on the cloud system. The server device 80 on the cloud system is configured by a plurality of units, so that the load of processings in the server device 80 may be distributed.

Figure 30:
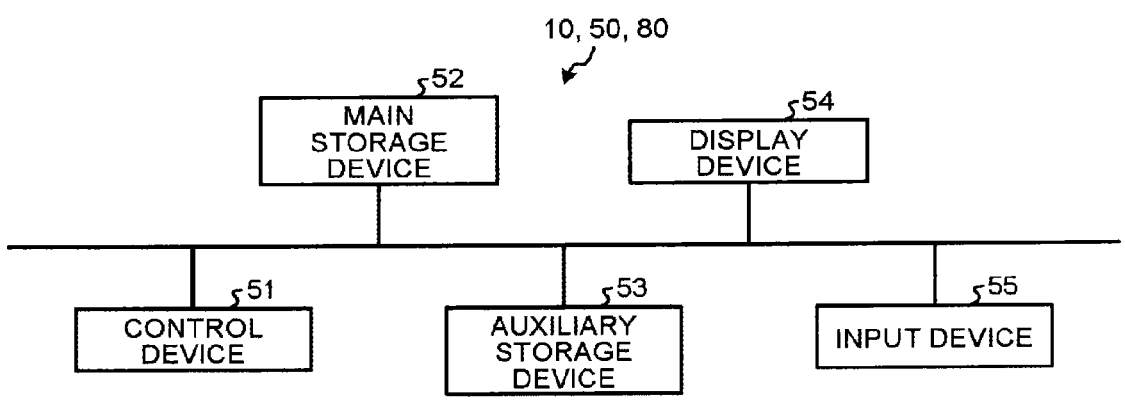
FIG. 30 is a diagram illustrating a hardware configuration example of the host device and the DFE according to the third and the fourth embodiments and of the server device according to the fourth embodiment.

Lastly, a hardware configuration of the host device 10 and the DFE 50 according to the third and the fourth embodiments and of the server device 80 according to the fourth embodiment will be explained below. FIG. 30 is a diagram illustrating a hardware configuration example of the host device 10 and the DFE 50 according to the third and the fourth embodiments and of the server device 80 according to the fourth embodiment.

The hardware configuration of the host device 10, the DFE 50, and the server device 80 is a hardware configuration provided in an ordinary computer. In other words, each of the host device 10, the DFE 50, and the server device 80 includes a control device 51, a main storage device 52, an auxiliary storage device 53, a display device 54, and an input device 55. The control device 51 is, for example, CPU that controls the entire device. The main storage device 52 is, for example, ROM and RAM that store various data and various programs. The auxiliary storage device 53 is, for example, HDD that stores various data and various programs. The display device 54 is a display device or the like. The input device 55 is a keyboard, a mouse, and the like.

The image processing program (the program includes the image processing application. This is the same hereinafter) executed by the host device 10 according to the embodiments is provided as a computer program product by being recorded in a computer-readable recording medium such as a compact disk read only memory (CD-ROM), a flexible disk (FD), a compact disk recordable (CD-R), and a digital versatile disk (DVD) as a file in an installable format or in an executable format.

It may be configured so that the image processing program executed by the host device 10 according to the embodiments is provided by being stored on a computer connected to a network such as the Internet and being downloaded via the network. It may also be configured so that the image processing program executed by the host device 10 according to the embodiments is provided or distributed via a network such as the Internet.

Moreover, it may be configured so that the image processing program executed by the host device 10 according to the embodiments is provided by being previously installed into ROM or the like.

The image processing program executed by the host device 10 according to the embodiments is configured with modules including the units (the image processing unit, the plane data generating unit, the print data generating unit, the input control unit, and the display control unit). As actual hardware, the CPU (processor) reads the image processing program from the recording medium and executes the read image processing program, and the units are thereby loaded on the main storage device. Thus the image processing unit, the plane data generating unit, the print data generating unit, the input control unit, and the display control unit are generated on the main storage device.

Print control processing executed by the DFE 50 or by the server device 80 according to the embodiments may be implemented by a print control program as software in addition to implementation by hardware. In this case, the print control program executed by the DFE 50 or by the server device 80 according to the embodiments is provided by being previously installed into ROM or the like.

It may be configured so that the print control program executed by the DFE 50 or by the server device 80 according to the embodiments is provided as a computer program product by being recorded in a computer-readable recording medium such as CD-ROM, FD, CD-R, DVD as a file in an installable format or in an executable format.

Moreover, it may be configured so that the print control program executed by the DFE 50 or by the server device 80 according to the embodiments is provided by being stored on a computer connected to a network such as the Internet and being downloaded via the network. It may also be configured so that the print control program executed by the DFE 50 or by the server device 80 according to the embodiments is provided or distributed via a network such as the Internet.

The print control program executed by the DFE 50 or by the server device 80 according to the embodiments is configured with modules including the units (receiving unit 501, first generating unit 502, second generating unit 503, insuring unit 507, setting unit 509, calculating unit 511, first correcting unit 512, second correcting unit 513, TRC 514, and halftone engine 515). As actual hardware, the CPU (processor) reads the print control program from the ROM and executes the read print control program, and the units are thereby loaded on the main storage device. Thus, the receiving unit 501, the first generating unit 502, the second generating unit 503, the insuring unit 507, the setting unit 509, the calculating unit 511, the first correcting unit 512, the second correcting unit 513, the TRC 514, and the halftone engine 515 are generated on the main storage device.

In the image forming system according to the embodiments, toners in the colors of CMYK are used to form an image; however, a toner in a single color may be used to form an image.

According to the present invention, there is an effect that the amount of a transparent color material can be adjusted without losing a sense of unity and a gradation property as an entire image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
circuitry configured as
   a first generating unit that generates chromatic color material image data representing a recording amount of a chromatic color material in each pixel of an image from first image data indicating the image formed by using the chromatic color material;
   a second generating unit that generates transparent color material image data representing a recording amount of a transparent color material in each pixel of an image from second image data indicating the image formed by using the transparent color material;
   a storage unit that stores a total recording amount of color materials indicating an upper limit of a recording amount of the color materials and a maximum recording amount of the transparent color material indicating an upper limit of a recording amount assignable to the transparent color material, for color material image data indicating an image formed from the chromatic color material image data and the transparent color material image data; and
   a correcting unit that calculates a recording amount assignable to the transparent color material by subtracting the recording amount of the chromatic color material from the total recording amount of color materials, and corrects the recording amount of the transparent color material in each pixel of the transparent color material image data based on a ratio between the recording amount assignable to the transparent color material and the maximum recording amount of the transparent color material.

2. The image processing apparatus according to claim 1, further comprising circuitry configured as an insuring unit that determines an insured amount indicating a lower limit of the recording amount assignable to the transparent color material, wherein
   the correcting unit determines the recording amount assignable to the transparent color material as the insured amount, when the recording amount assignable to the transparent color material is smaller than the insured amount.

3. The image processing apparatus according to claim 2, wherein
   the insuring unit determines the insured amount according to a type of a surface effect to be applied by using the transparent color material.

4. The image processing apparatus according to claim 2, wherein when the recording amount assignable to the transparent color material is determined as the insured amount and when a color material recording amount, in which a recording amount of the corrected transparent color material and the recording amount of the chromatic color material are combined, is greater than the total recording amount of color materials, the correcting unit performs correction so as to reduce the recording amount of the chromatic color material.

5. The image processing apparatus according to claim 4, wherein the correcting unit performs correction so as to reduce the recording amount of the chromatic color material, based on a ratio of a value obtained by subtracting the recording amount of the corrected transparent color material from the total recording amount of color materials and the total recording amount of color materials.

6. The image processing apparatus according to claim 1, wherein when the recording amount assignable to the transparent color material is equal to or less than zero, the correcting unit sets the recording amount assignable to the transparent color material to zero.

7. The image processing apparatus according to claim 1, wherein when the recording amount assignable to the transparent color material is equal to or greater than the maximum recording amount of the transparent color material, the correcting unit sets the recording amount assignable to the transparent color material as the maximum recording amount of the transparent color material.

8. The image processing apparatus according to claim 1, wherein the first generating unit further generates object information indicating a type of an image in each image area from the first image data, and the storage unit stores the total recording amount of color materials in the image area according to the object information.

9. An image processing method executed by an image processing apparatus, the method comprising:

generating chromatic color material image data representing a recording amount of a chromatic color material in each pixel of an image from first image data indicating the image formed by using the chromatic color material;

generating transparent color material image data representing a recording amount of a transparent color material in each pixel of an image from second image data indicating the image formed by using the transparent color material;

referring to a total recording amount of color materials indicating an upper limit of a recording amount of the color materials and to a maximum recording amount of the transparent color material indicating an upper limit of a recording amount assignable to the transparent color material, for color material image data indicating an image that is formed from the chromatic color material image data and the transparent color material image data; and calculating a recording amount assignable to the transparent color material by subtracting the recording amount of the chromatic color material from the total recording amount of color materials, and correcting the recording amount of the transparent color material in each pixel of the transparent color material image data based on a ratio of the recording amount assignable to the transparent color material and the maximum recording amount of the transparent color material.

* * * * *